(12) United States Patent
Tanimoto

(10) Patent No.: US 7,119,929 B2
(45) Date of Patent: Oct. 10, 2006

(54) ELECTRONIC MAIL MACHINE AND INTERNET FACSIMILE MACHINE

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 997 days.

(21) Appl. No.: 10/104,510

(22) Filed: Mar. 20, 2002

(65) Prior Publication Data

US 2002/0135813 A1    Sep. 26, 2002

(30) Foreign Application Priority Data

| Mar. 22, 2001 | (JP) | ............................. 2001-082200 |
| Apr. 3, 2001 | (JP) | ............................. 2001-104682 |
| Apr. 19, 2001 | (JP) | ............................. 2001-120963 |

(51) Int. Cl.
*H04N 1/00* (2006.01)

(52) U.S. Cl. ............ 358/405; 379/100.08; 379/100.09; 379/100.01

(58) Field of Classification Search ............... 358/1.18, 358/1.15, 468, 405, 402; 379/88.03, 88.04, 379/100.08, 100.09, 100.01
See application file for complete search history.

(56) References Cited

U.S. PATENT DOCUMENTS

| 2002/0080414 | A1 * | 6/2002 | Tanimoto | .................... | 358/402 |
| 2002/0091781 | A1 * | 7/2002 | Yashiki | ....................... | 709/206 |
| 2002/0114016 | A1 * | 8/2002 | Tsuchiya | .................... | 358/402 |
| 2002/0135813 | A1 * | 9/2002 | Tanimoto | .................... | 358/402 |
| 2003/0135568 | A1 * | 7/2003 | Kim et al. | .................. | 709/206 |

FOREIGN PATENT DOCUMENTS

| JP | 10-217580 | 8/1998 |
| JP | 10-336465 | 12/1998 |
| JP | 11-088708 | 3/1999 |
| JP | 11-098273 | 4/1999 |
| JP | 11-115277 | 4/1999 |
| JP | 11-252164 | 9/1999 |
| JP | 11-261628 | 9/1999 |
| JP | 2000-032202 | 1/2000 |
| JP | 2000-125068 | 4/2000 |
| JP | 2000-287004 | 10/2000 |
| JP | 2002-199150 | * 7/2002 |
| JP | 2002-223342 | 8/2002 |
| JP | 02002281230 | * 9/2002 |
| JP | 2002-300343 | 10/2002 |
| JP | 02002-314779 | * 10/2002 |
| JP | 02002368815 | * 12/2002 |
| JP | 2003-274101 | * 3/2003 |
| JP | 02003115971 | * 4/2003 |
| JP | 02003125149 | * 4/2003 |

\* cited by examiner

*Primary Examiner*—Jerome Grant, II
(74) *Attorney, Agent, or Firm*—Hogan & Hartson LLP

(57) ABSTRACT

An Internet facsimile communication method and an Internet facsimile machine wherein the Internet facsimile machine of the transmitting side shortens the time required from starting of the scanning of the original to be transmitted and receiving of the image data of the original at the terminal of the receiving side, until the completion of the processing such as printing or distributing of the image data. In one example, the Internet facsimile machine of the transmitting side is capable of transmitting, in still shorter period of time, the image data most appropriate to the ability of the Internet facsimile machine of the receiving side, and the Internet facsimile machine for carrying out this Internet facsimile communication method is provided. In another example, a communication system is provided for shortening the time until the delivery confirmation is replied, by replying the electronic mail of the delivery confirmation efficiently.

20 Claims, 28 Drawing Sheets

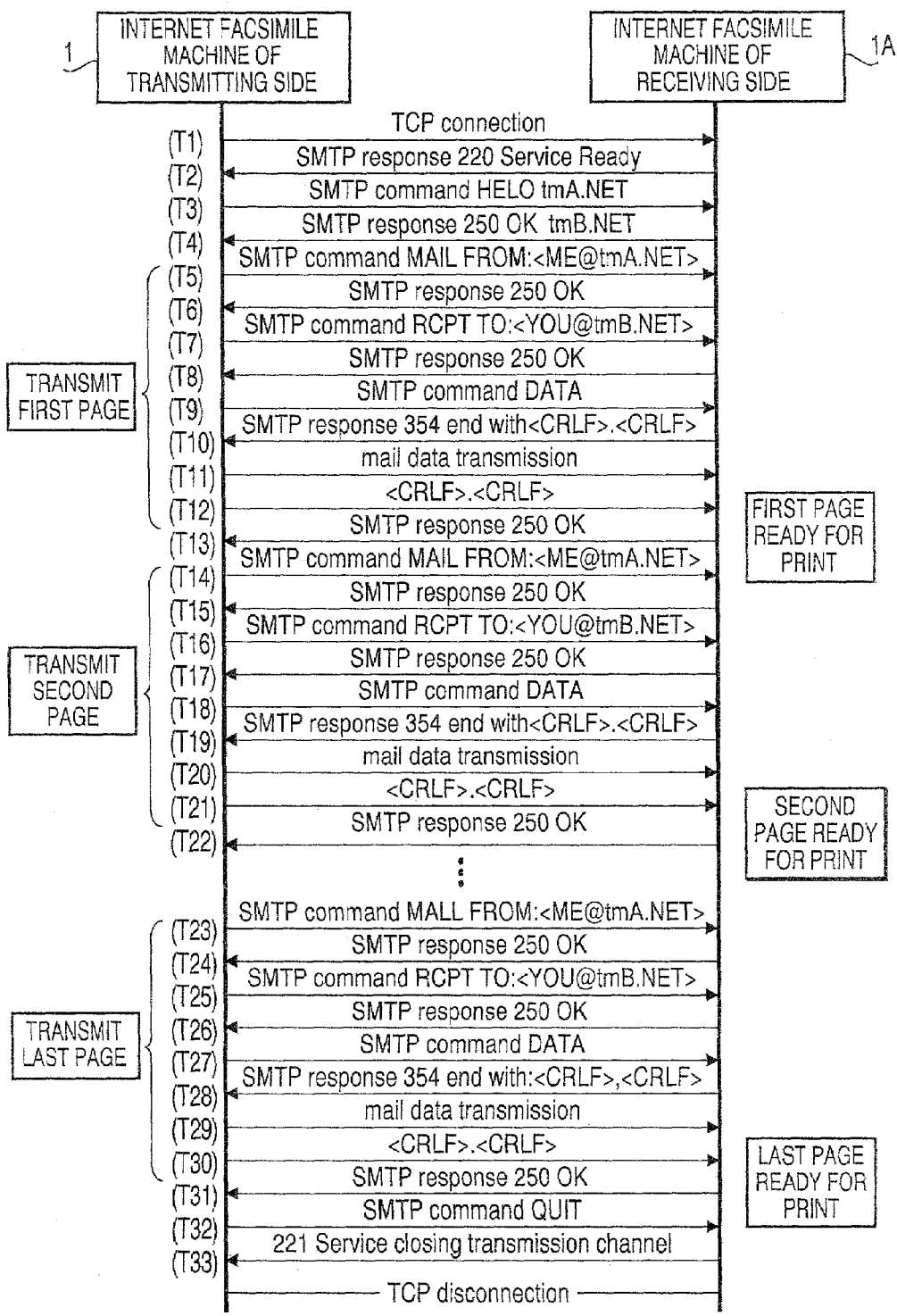

22

| SPEED DIAL NUMBER | NAME OF OTHER END | DESTINATION | ATTRIBUTES |
|---|---|---|---|
| 001 | ○○ MACHINERY | YOU@tmB.NET | INTERNET FACSIMILE MACHINE WITH SMTP SERVER FUNCTION; NOT PASSING THROUGH RELAY MAIL SERVER |
| 002 | ○○ MACHINERY | 123@def.co.jp | PC WITH SMTP SERVER FUNCTION, NOT PASSING THROUGH RELAY MAIL SERVER |
| 003 | ○○ MACHINERY | 456@deg.co.jp | MAIL CLIENT, PASSING THROUGH RELAY MAIL SERVER |
| 004 | ×× COMPANY | ifax2@abc.co.jp | INTERNET FACSIMILE MACHINE WITH SMTP SERVER FUNCTION; PASSING THROUGH RELAY MAIL SERVER |
| 005 | ×× COMPANY | aaa@abc.co.jp | MAIL CLIENT, PASSING THROUGH RELAY MAIL SERVER |

FIG. 6

| SPEED DIAL NUMBER | NAME OF OTHER END | DESTINATION | ATTRIBUTES |
|---|---|---|---|
| 001 | ○○ MACHINERY | YOU@tmB.NET | INTERNET FACSIMILE MACHINE WITH SMTP SERVER FUNCTION |
| 002 | ○○ MACHINERY | 123@def.co.jp | |
| 003 | ○○ MACHINERY | 456@deg.co.jp | |
| 004 | ×× COMPANY | MMM@tmC.NET | INTERNET FACSIMILE MACHINE WITH SMTP SERVER FUNCTION |
| 005 | ×× COMPANY | aaa@abc.co.jp | |

```
From:ME@tmA.NET
Date:Wed,14 Mar 2001 16:05:04 +0900
To You@tmB.NET
Subject:IFAX
Message — ID:<2147483648@tmA.NET>
→ Disposition — Notification — To:ME@tmA.NET
MIME — Version:1.0
Content — Type:multipart/mixed;
        boundary="=_029036190440046147040290352591_="
...
```

ELECTRONIC MAIL MACHINE AND INTERNET FACSIMILE MACHINE

CROSS REFERENCES TO RELATED APPLICATIONS

This application claims priority under 35 USC 119 of Japanese Patent Application Nos. 2001-104682, 2001-082200, and 2001-120963 filed in JPO on Apr. 3, 2001, Mar. 22, 2001, and Apr. 19, 2001, respectively, the entire disclosures of which are incorporated herein by reference.

BACKGROUND OF THE INVENTION

1. Field of the Invention

The present invention relates to an electronic mail device for transmitting and receiving electronic mail, and more specifically to an Internet facsimile machine for transmitting and receiving image data as a file attached to the electronic mail.

2. Description of the Related Art

Recently, an Internet facsimile machine for transmitting and receiving image data of an original such as a document in the form of electronic mail is in widespread use. According to the Internet facsimile machine, the image data of the original read in from a scanning unit, which is provided within the Internet facsimile machine, is converted into the image data of a format capable of being attached to electronic mail, and can be transmitted to another Internet facsimile machine or the like capable of receiving the electronic mail which has the attached file of the image data.

Such a file attached to electronic mail includes a large amount of information and requires a certain period of time for transmitting or receiving. When the number of pages to be transmitted is large, for example, in the case the original is comprised of 100 to 200 pages, a long period of time is required. Moreover, in the Internet facsimile machine at the receiving side, after receiving the encrypted attached file, the attached file is decrypted. Furthermore, it is necessary to carry out dividing processing per each page or the like. As a result, it requires even longer period of time until completing the processing such as printing or distributing of the received image data.

Moreover, generally, the Internet facsimile machine at the transmitting side transmits image data under a certain format without confirming the ability of the Internet facsimile machine at the receiving side. This ability is, for example, an encrypting method of image data by which the image data can be received by the Internet facsimile machine at the receiving side, or a size of recording paper capable of being printed out (for example A3, A4 sizes). Therefore, it is difficult to transmit image data which is most appropriate to the ability of the Internet facsimile machine of the receiving side.

In the exchanging of the electronic mail accompanying delivery confirmation demand such as DSN (Delivery Status Notification) or MDN (Message Disposition Notification), the transmitting side establishes an SMTP (Simple Mail Transfer Protocol) session, and transmits the electronic mail with the delivery confirmation demand. After closing the SMTP session once, a new SMTP session is established, and the electronic mail of delivery confirmation is transmitted from the receiving side. Therefore, there was a problem in that it took a long period of time to receive the electronic mail of the delivery confirmation at the transmitting side.

SUMMARY OF THE INVENTION

A first object of the present invention is to provide an Internet facsimile communication method and an Internet facsimile machine for shortening a period of time from the time an original such as a document to be transmitted to the time the processing such as printing and distribution of the image data of the original is completed after the image data is received by a terminal at the receiving side.

A second object of the present invention is to provide an Internet facsimile communication method and an Internet facsimile machine for transmitting optimum image data corresponding to the ability of an Internet facsimile machine at the receiving side while it takes more shortened period of time to transmit the optimum image data.

A third object of the present invention is to provide an electronic mail communication system for sending back the electronic mail of the delivery confirmation efficiently, and enabling the delivery confirmation to be returned sooner, and to provide a communication device suitable to be used in such a communication system.

According to one aspect of the present invention, there is provided an Internet facsimile communication method in which the image data of the original to be transmitted is formed per page of the original, and each image data formed per page of the original is transmitted as the attached file of one electronic mail respectively within one electronic mail forwarding protocol session. Therefore, it is possible to considerably shorten a require time from the time reading of the original is started to the time transmission of all-page image data is completed.

According to another aspect of the present invention, there is provided an Internet facsimile machine having a mail server function in which this Internet facsimile machine has a role of a mail server which is a destination. Therefore, it is possible to obtain, from this Internet facsimile machine, information of processing result of the received image data within the same electronic mail forwarding protocol session which is used for transmitting the electronic mail having the attached image data.

According to another aspect of the present invention, it is judged whether or not the destination of the image data is a destination to which the electronic mail can be transmitted without passing through a relay mail server. In the case where the destination of the image data is the Internet facsimile machine having the mail server function to which the electronic mail can be transmitted without passing through the relay mail server, the image data of the original to be transmitted is formed per page, and each image data formed per page of the original is transmitted as the attached file of one electronic mail respectively. On the other hand, in the case where the destination is not a destination to which the electronic mail can be transmitted without passing through the relay mail server, or in the case where the destination is not the Internet facsimile machine provided with the mail server function, all pages of the original to be transmitted is formed as one image file, and the image file is transmitted as the attached file of the electronic mail. Therefore, the transmission of the electronic mail can be carried out in an appropriate communication form to various destinations.

According to another aspect of the present invention, there is provided an Internet facsimile machine including means for carrying out output processing each time the Internet facsimile machine receives each electronic mail in the case of receiving a plurality of electronic mails within one electronic mail forwarding protocol session. Therefore, it is possible to considerably reduce the required time from the time the first electronic mail is received to the time the output processing of the last electronic mail is completed.

According to another aspect of the present invention, there is provided an Internet facsimile machine including means for replying the receiving processing result of each electronic mail in the form of electronic mail in the case of receiving a plurality of electronic mails within one electronic mail forwarding protocol session. Therefore, it is possible to considerably reduce the required time from the time the first electronic mail is received to the time the receiving processing of the last electronic mail is sent back.

According to another aspect of the present invention, there is provided an Internet facsimile machine including means for replying the receiving processing result of all electronic mails by one electronic mail after receiving all of a plurality of electronic mails in the case of receiving a plurality of electronic mails within one electronic mail forwarding protocol session. Therefore, compared with the case of replying the receiving processing result separately, the efficiency in the communication is improved.

According to another aspect of the Internet facsimile communication method of the present invention, the Internet facsimile machine of the transmitting side and the Internet facsimile machine of the receiving side exchange the information such as the information of the ability or the image data by carrying out the transmission and reception of the electronic mail reciprocally within one electronic mail forwarding protocol session, and the Internet facsimile machine of the transmitting side is capable of transmitting, within a short period of time, the image data most appropriate to the ability of the Internet facsimile machine of the receiving side.

According to another aspect of the present invention, in the step of judging the connection destination, the judging is made based on whether or not the domain name of the destination mail address corresponds to the domain name of the mail server relating to the destination mail address obtained by referring to the DNS (Domain Name System) server. Therefore, the Internet facsimile machine of the transmitting side can obtain, from outside of the electronic mail forwarding protocol session, the information on which it can be judged whether or not the connection is made with the Internet facsimile machine of the receiving side directly without passing through another mail server or without passing through other mail servers.

According to another aspect of the present invention, in the step of judging the connection destination, the judging is made based on the response command of the Internet facsimile machine of the receiving side which is a response to the command of the electronic mail forwarding protocol for designating the receiver of the electronic mail. This command is transmitted from the Internet facsimile machine of the transmitting side to the Internet facsimile machine of the receiving side. Therefore, after being connected to the Internet facsimile machine of the receiving side, the Internet facsimile machine of the transmitting side can judge whether or not the connection is made directly with the Internet facsimile machine of the receiving side without passing through another mail server or without passing through other mail servers.

According to another aspect of the communication system or the electronic mail communication device of the present invention, after the electronic mail with the delivery confirmation demand is transmitted, the transmission right reversing command is transmitted, and then the delivery confirmation demand can be replied without disconnecting the session. Therefore, compared with the case in which the session is established again, and then the delivery confirmation is transmitted as in a conventional manner, a reply to the delivery confirmation demand can be sent sooner, and it is possible to efficiently transmit the electronic mail of the delivery confirmation.

BRIEF DESCRIPTION OF THE DRAWINGS

FIG. 5 is a sequence diagram showing one SMTP session carried out between the Internet facsimile machine (of transmitting side) and the Internet facsimile machine (of receiving side) according to the first embodiment of the present invention;

FIG. 6 is a view showing an example of a data table held by the Internet facsimile machine (of the transmitting side) according to the embodiment of the present invention;

FIG. 14 is a view showing an example of a data table held by the Internet facsimile machine of the transmitting side;

FIG. 28 is a view showing the substantial part of the electronic mail with the delivery confirmation demand by MDN.

DETAILED DESCRIPTION OF THE INVENTION

First Embodiment

An Internet facsimile communication method and an Internet facsimile machine according to a first embodiment of the present invention will be described with reference to the accompanying drawings.

Figure 1:
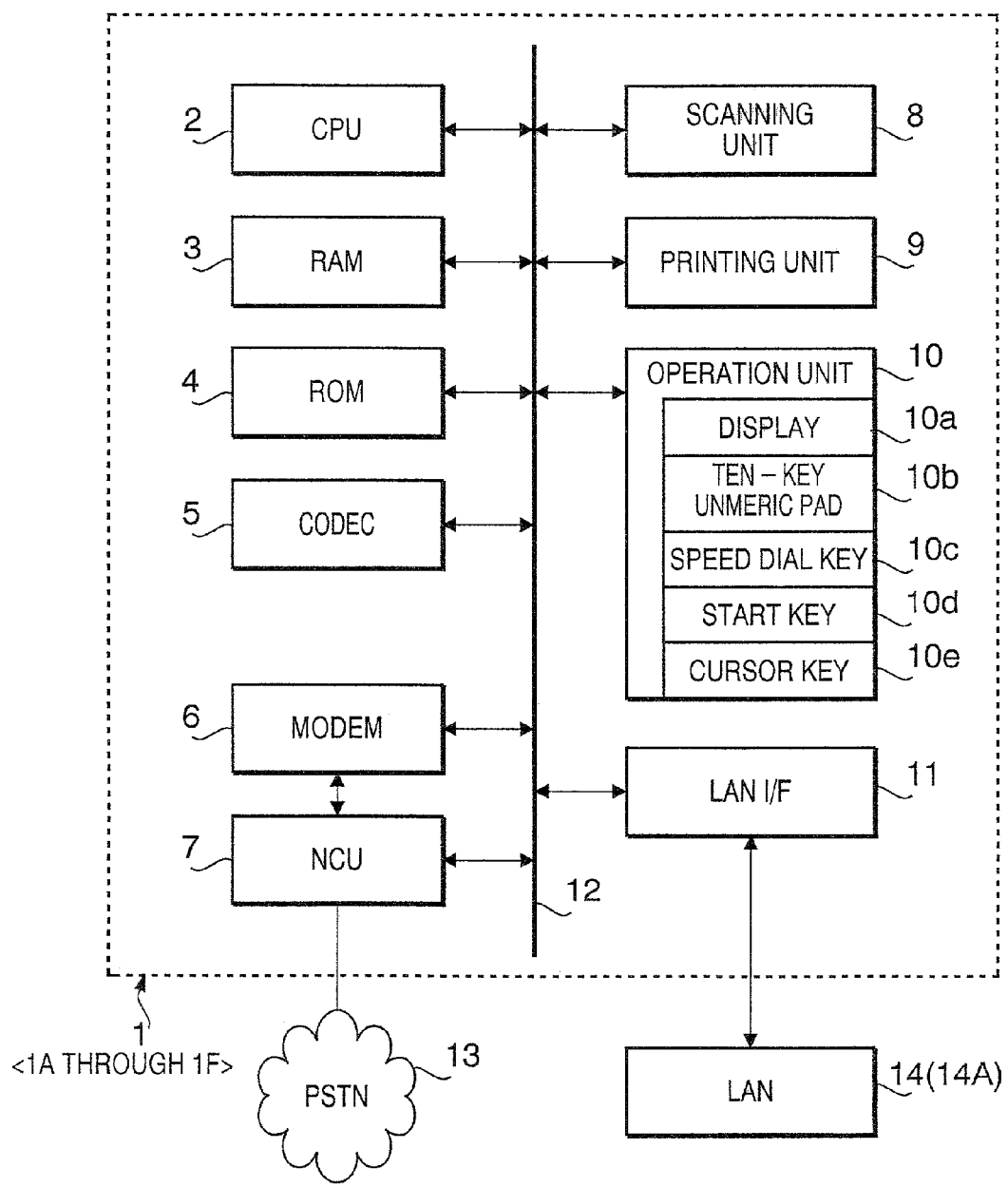
FIG. 1 is a block diagram showing an example of the hardware structure of an Internet facsimile machine (of transmitting side and receiving side) according to an embodiment of the present invention.

As shown in FIG. 1, an Internet facsimile machine 1 according to the first embodiment of the present invention comprises a CPU (Central Processing Unit) 2, a RAM (Random Access Memory) 3, a ROM (Read Only Memory) 4, a codec 5, a modem 6, an NCU (Network Control Unit) 7, a scanning unit 8, a printing unit 9, an operation unit 10, and a LAN I/F (Local Area Network Interface) 11. The units 2 through 11 are connected to each other by a bus 12 such that the communication can be carried out.

In accordance with a designated program, the CPU 2 controls each unit which is an element of the Internet facsimile machine 1.

The RAM 3 functions as a storing unit for storing in advance image data, a FAX number, a mail address and/or the like, or as a storing unit for various data or the like to be accumulated temporarily.

The ROM 4 stores various programs for controlling the working of each unit of the Internet facsimile machine 1 by the CPU 2.

The codec 5 carries out encryption and decryption in accordance with a plurality of protocols. In other words, for transmitting the image data or the like scanned by the scanning unit 8, the image data is encrypted by MH (Modified Huffman), MR (Modified Read), MMR (Modified Modified Read) methods or the like, and the received data is decrypted. Moreover, encryption and decryption can be carried out in accordance with TIFF (Tagged Image File Format) which is an image format used generally by a computer. Further, the specification of TIFF is publicized by Adobe System of the U.S., and as the name shows, the data is expressed by using a tag to a data block within a file, and by using the tag, a plurality of image data resolution of which or the number of colors of which differs can be stored at the same time.

The modem 6 carries out modulation and demodulation of the data to be transmitted and received following, for example, the V.34 standard of the ITU-T (International Telecommunications Union) Recommendation or something similar to this.

The NCU 7 is a network control device for calling or disconnecting the telephone by controlling a telephone line, and can be connected to a PSTN (Public Switched Telephone Network) 13.

The scanning unit 8 outputs the image data converted into a binary of black and white by scanning the image data of the original.

The printing unit 9 may be an electrophotographic type or the like, and forms the image of the received image data onto recording paper and discharges the recording paper. For example, the image data of the original scanned by the scanning unit 8, the image data received by the facsimile, the image data of the attached file received by the Internet facsimile, the text data of the main text, or/and the like are printed out by the instruction of the CPU 2.

The operation unit 10 comprises a display 10a for displaying information concerning the condition of the Internet facsimile machine 1 and the screen of various operation instructions, a ten-key numeric pad 10b for inputting a FAX number or the like, a speed dialing key 10c for dialing from a speed dial number, a start key 10d for carrying out the starting of the scanning operation of the original, and a cursor key 10e for moving a pointer within the display 10a. Various operations are carried out by the operation unit 10.

The LAN I/F 11 comprises an interface which can be connected to a LAN (Local Area Network) 14, and connects the LAN 14 and the Internet facsimile machine 1 so that the communication can be carried out between the LAN 15 and the Internet facsimile machine 1.

The Internet facsimile machine 1 is provided with the function of carrying out facsimile transmission and reception of the image data of the original by a G3 method or the like, and also provided with TCP/IP (Transmission Control Protocol/Internet Protocol). The Internet facsimile machine further includes an Internet facsimile function for transmitting and receiving, along with the main text of the electronic mail, the image data of the original or the like which is attached to the electronic mail as the attachment file. Furthermore, the Internet facsimile machine 1 is provided with a function as an SMTP (Simple Mail Transfer Protocol)

server (in other words, a mail server), and is capable of at least establishing the SMTP connection with another SMTP server or the like, and then transmitting and receiving an SMTP command or the data through the connection. Further, the SMTP is an electronic mail forwarding protocol which is generally used in the forwarding of the electronic mail, and is a protocol defined in RFC (Request for Comments) 821, 822.

Furthermore, a data table 22 shown in FIG. 6 is stored in a predetermined storing area of the RAM 3 of the Internet facsimile machine 1. The data table 22 stores information concerning "name of other end", "destination", and "attribute" of each "speed dial number". For example, when designating the speed dial number "001" as a destination, the Internet facsimile machine of the transmitting side 1 designates "YOU@tmB.NET" as a destination, and at the same time, obtains the attribute information that the terminal of the destination is "Internet facsimile machine with the SMTP server function, not passing through a relay mail server", i.e., the information that the terminal of the destination is the Internet facsimile machine provided with the SMTP server and that when transmitting the electronic mail to the machine, the electronic mail can be exchanged directly by the SMTP, without passing through the relay mail server. The expression "PC with SMTP server function, not passing through relay mail server" shown in the "attribute" section of the speed dial number "002" shows that it is the PC provided with the SMTP server function and that when transmitting the electronic mail to this PC, the electronic mail can be exchanged directly by the SMTP without passing through the relay mail server. The expression "mail client, passing through relay mail server" shown in the "attribute" sections of the speed dial number "003" and "005" shows that it is the mail client terminal under the mail server, and shows that when transmitting the electronic mail to this mail client, the electronic mail is transmitted via at least such a mail server. The expression "Internet facsimile machine with SMTP server function, passing through relay mail server" shown in "attribute" section of the speed dial number "004" shows that it is the Internet facsimile machine provided with the SMTP server function, but shows that when transmitting the electronic mail to this machine, the electronic mail passes via the relay mail server.

Figure 2:
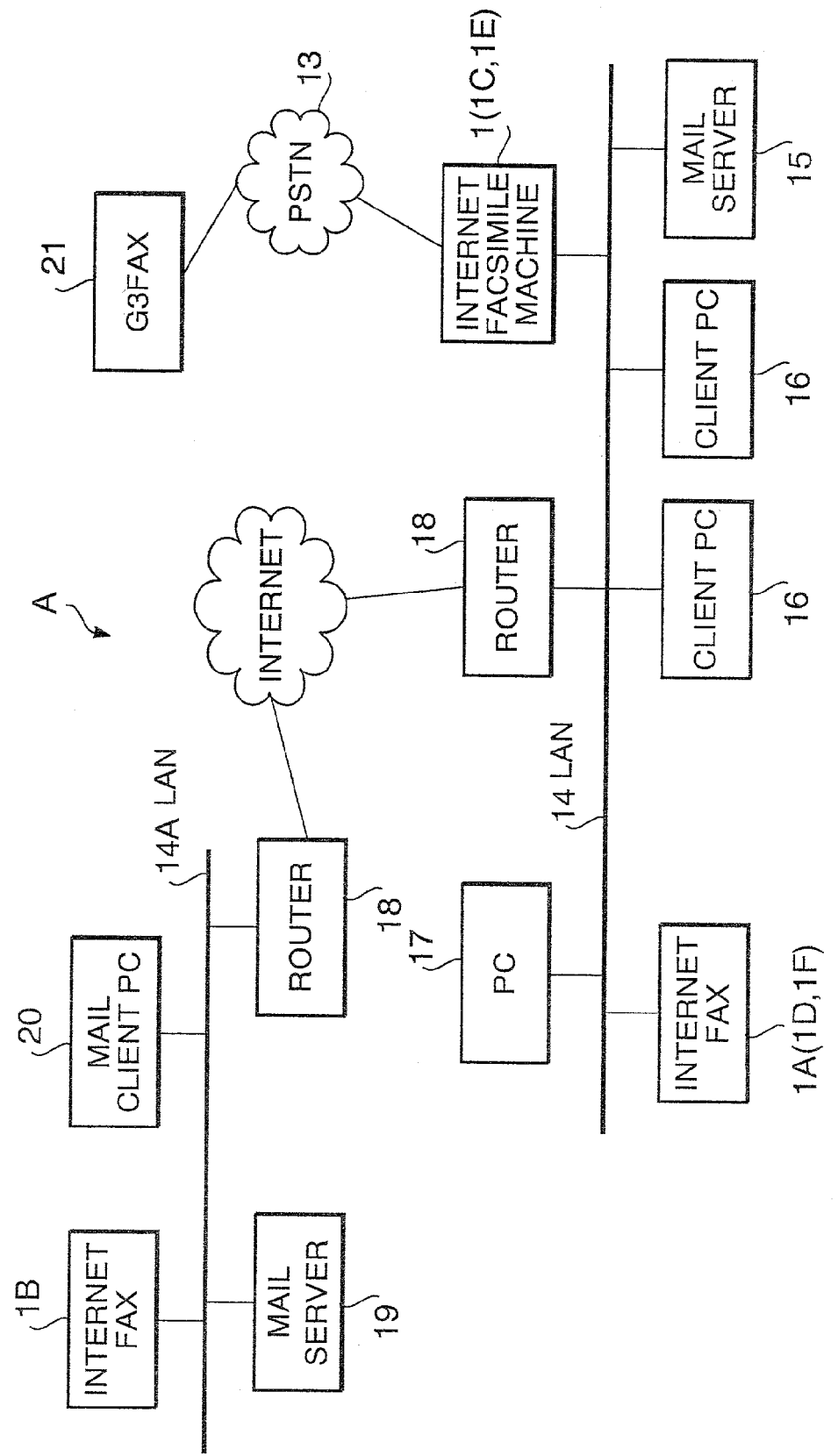
FIG. 2 is a block diagram showing an example of a network environment where the Internet facsimile machine (of a transmitting side and a receiving side) is provided according to the embodiment of the present invention.

According to the first embodiment of the present invention, as one example, the following description based on the flow charts and the sequence diagram is directed to the operation in the case where the Internet facsimile machine 1 is provided in a network environment A shown in FIG. 2, and transmits, in the form of the electronic mail, data of the original such as a document comprised of a plurality of pages, and is directed to the operation of another Internet facsimile machines 1A which receives this electronic mail. Another Internet facsimile machines 1A (hereinafter, referred to as the "Internet facsimile machine 1A at the receiving side") is provided with the hardware structure shown in FIG. 1 and the SMTP server function, as in the same manner as the Internet facsimile machine 1 (hereinafter, referred to as the "Internet facsimile machine 1 at the transmitting side"). The operation of the Internet facsimile machine at the transmitting side 1 will be described based on the flow chart shown in FIG. 3, the operation of the Internet facsimile machine at the receiving side 1A will be described based on the flow chart shown in FIG. 4, and the SMTP session formed between the Internet facsimile machine 1 at the transmitting side and the Internet facsimile machine 1A at the receiving side will be described based on the sequence diagram shown in FIG. 5. Various operations to be described based on the flow charts are carried out by following commands generated by the CPU 2 based on a control program or the like stored in each ROM 4.

In the network environment A shown in FIG. 2, the Internet facsimile machine 1 at the transmitting side is connected capable of carrying out reciprocal communication, through the LAN 14, with a mail server 15, client PCs 16, a PC with the SMTP server function 17, the Internet facsimile machine 1A at the receiving side, a router 18 or the like. Moreover, the Internet facsimile machine 1 at the transmitting side can carry out transmitting and receiving of the image data in the form of the electronic mail, through the Internet, to and from a mail server 19, a mail client PC 20 under the command of the mail server 19, and another Internet facsimile machine 1B which are connected to another LAN 14A. Furthermore, the Internet facsimile machine 1 can also carry out transmitting and receiving the image data of the G3 format, to and from a G3 FAX terminal 21, through a PSTN (Public Switched Telephone Network) 13.

Among the terminals shown in the network environment A, as the "destination" stored in the data table 22, for example, the Internet facsimile machine 1A at the receiving side is registered to the speed dial number "001", the PC 17 is registered to the speed dial number "002", one of the client PCs 16 is registered to the speed dial number "003", the Internet facsimile machine 1B is registered to the speed dial number "004", and the mail client PC 20 is registered to the speed dial number "005".

Figure 3:
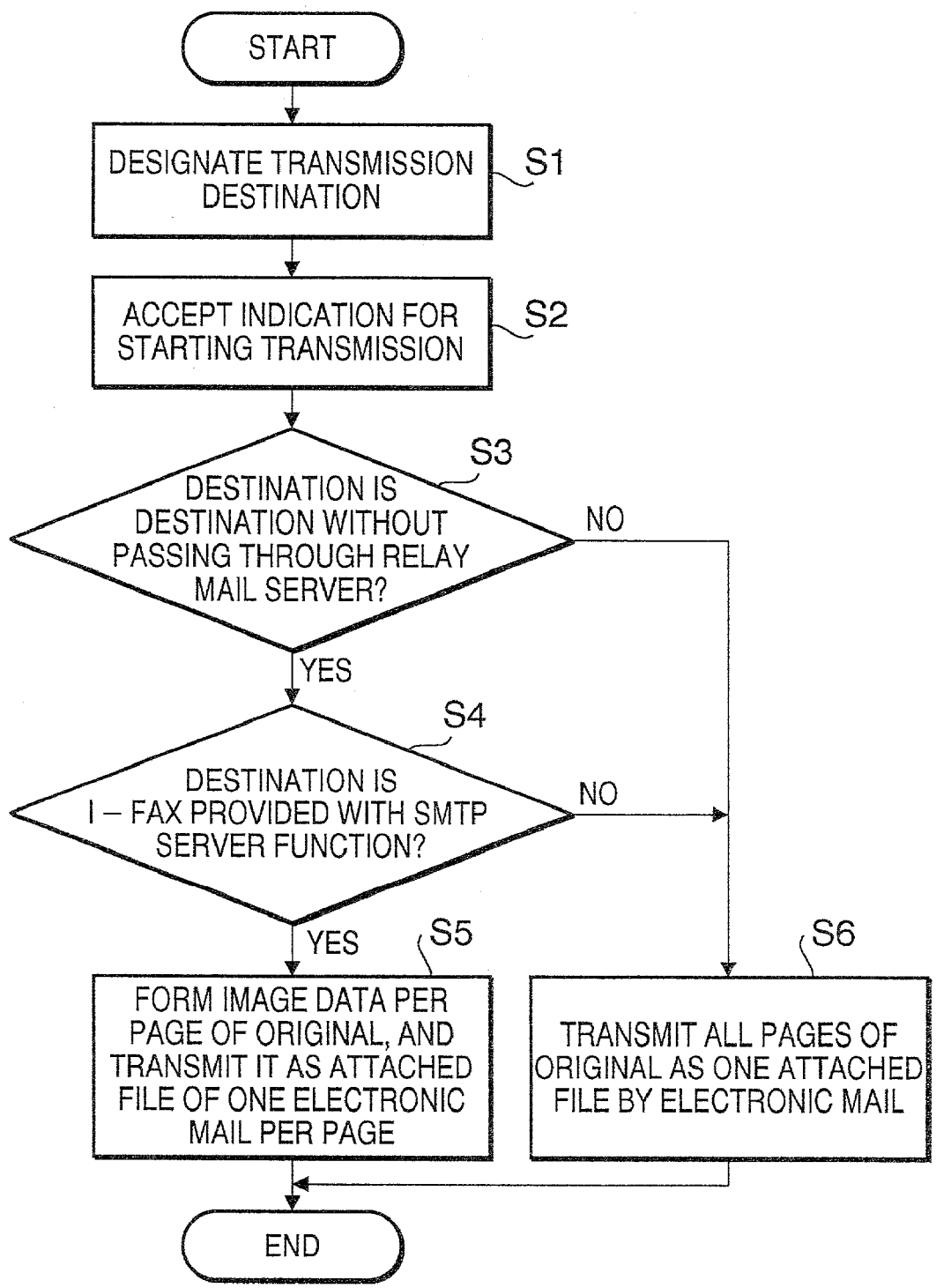
FIG. 3 is a flow chart showing the operation of the Internet facsimile machine (of the transmitting side) according to a first embodiment of the present invention.

First, an operator sets the original such as a document comprised of a plurality of pages in the scanning unit 8, and when the speed dial key 10c is pressed to specify a destination, the Internet facsimile machine 1 of the transmitting side designates the destination assigned to the pressed speed dial number in accordance with the data table 22 (in the step S1 of FIG. 3). Next, when receiving the instruction for starting the transmission by the start key 10d being pressed by the operator (in the step S2), it is judged, in accordance with the data table 22, whether or not the direct destination (other end) is the final destination, i.e., whether or not the destination is a destination capable of receiving the electronic mail without passing through a relay mail server (in the step S3). Furthermore, it is judged whether or not the destination is an Internet facsimile machine provided with the SMTP server function (in the step S4).

For example, in the step S1, when the speed dial number "001" is designated, the Internet facsimile machine 1 at the transmitting side designates "YOU@tmB.NET" as a destination, based on the data table 22, and judges that the destination is a destination capable of receiving the electronic mail without passing through a relay mail server, based on the expression "Internet facsimile machine with SMTP server function, not passing through relay mail server" in "attribute" section (in the step S3). Furthermore, when the machine of the destination is judged to be an Internet facsimile machine provided with the SMTP server function (in the step S4), the Internet facsimile machine 1 at the transmitting side reads in the original to be transmitted, forms the image data per page of the original under the TIFF format or the like so that each image data corresponding to each page can be attached to one electronic mail, and transmits the image data formed per page of the original as the attached file of one electronic mail sequentially (in the step S5). As in the manner stated above, since the image data is formed sequentially from the page of the original which has been read in, and then transmitted as an attached file of one electronic mail, a period of time required from the time scanning of the original is started to the time the transmission of the image data of all pages of the original is completed can be reduced greatly, compared with the case in which after all pages of the original are scanned, the image data of the all pages is transmitted as one attached file by electronic mail.

On the other hand, when the speed dial number "002" is designated in the step S1, "123@def.co.jp" is designated as a destination, and it is judged that transmission to the destination can be carried out without passing through a relay mail server, based on the expression "PC with SMTP function, not passing through relay mail server" of the "attribute" section (in the step S3). Subsequently, it is judged that the machine of the destination is not an Internet facsimile machine (in the step S4), and the procedure proceeds to the step S6. When the speed dial number "003" is designated, "456@deg.co.jp" is designated as a destination, and it is judged that the destination receives electronic mail via a relay mail server, based on the expression "mail client, passing through relay mail server" of the "attribute" section (in the step S3), and the procedure proceeds to the step S6 When the speed dial number "004" is designated, it is judged that the destination receives electronic mail via a relay mail server, based on the expression "Internet facsimile machine with SMTP server function, passing through relay mail server" of the "attribute" section (in the step S3), and the procedure proceeds to the step S6. When the speed dial number "005" is designated, the same procedure is carried out as when the speed dial number "003" is designated.

In the step S6, the Internet facsimile machine 1 at the transmitting side forms all pages of the original as one TIFF file which can be attached to electronic mail, and the TIFF file is transmitted as the attached file of the electronic mail in the step S6.

Next, the operation in the step S5 when transmitting image data of the original from the Internet facsimile machine 1 at the transmitting side to the Internet facsimile machine 1A at the receiving side will be described in accordance with the sequence diagram shown in FIG. 5. As shown in the sequence diagram, the image data of all pages of the original is transmitted by separate electronic mail respectively within one SMTP session from the establishment of the TCP connection until the disconnection.

First, the Internet facsimile machine 1 of the transmitting side demands the TCP connection to the Internet facsimile machine of the receiving side 1A, the Internet facsimile machine 1A of the receiving side returns the SMTP response code "220" to the effect that the Internet facsimile machine 1A approves the demand. In this manner, the TCP connection is established between the Internet facsimile machine 1 of the transmitting side and the Internet facsimile machine 1A of the receiving side (T1, T2).

Next, the Internet facsimile machine 1 at the transmitting side specifies itself by the SMTP command "HELO tmA-.NET" to the Internet facsimile machine 1A at the receiving side. In this case, "tmA.NET" which is a parameter is designated as a domain name of the Internet facsimile machine 1 of the transmitting side. In response to this, the Internet facsimile machine 1A at the receiving side sends a reply of the SMTP response code "250", and also designates, as a parameter, "tmB.NET" which is its own domain name (T3, T4). The SMTP response code "250" is a response code which shows that processing of the demanded SMTP command is completed.

After that, the Internet facsimile machine 1 of the transmitting side specifies its own mail address "ME@tmA.NET" by the SMTP command "MAIL FROM: <ME@tmA.NET>" (T5). After designating the receiver (destination) by the SMTP command "RCPT TO: <YOU@tmB.NET>" (T7), the Internet facsimile machine 1 of the transmitting side determines transmission of the image data corresponding to the first page of the original attached to electronic mail by the SMTP command "DATA", receives the SMTP response code "354 end with <CRLF>.<CRLF>", and carries out the transmission of the image data (T9 through T11). Then, by transmitting the line "<CRLF>.<CRLF>" ("CRLF" means starting of a new line) which includes only a period ".", the completion of the transmission of the image data is specified (T12). Furthermore, by repeating the operation of T5 through T13 until the image data of the last page is transmitted, the image data of each page is transmitted by being attached to separate electronic mail (for example, T14 through T21, T23 through T30).

In this manner, at the Internet facsimile machine 1A of the receiving side which receives the image data transmitted from the Internet facsimile machine 1 of the transmitting side, when the receiving of the image data of each page attached to each electronic mail is completed, i.e., after T12, T21, T30 or the like, output processing such as printing of the received image data of each page is carried out. In other words, each time the Internet facsimile machine 1A at the receiving side receives the image data (in the step S11), the Internet facsimile machine 1A immediately generates a printing job of the received image data of each page (in the step S12), and sequentially carries out printing or the like by the printing unit 9.

Since the Internet facsimile machine 1A of the receiving side generates the printing job sequentially, and carries out printing from the image data of the received page, it is possible to considerably shorten the required period of time which is from the start of the receiving to the completion of the printing of all pages, compared with the case in which after completely receiving the image data of all pages of the original, printing is started. In addition, such an advantage can be earned not only in the print processing but also in different output processing. For example, when the Internet facsimile machine 1A of the receiving side carries out forwarding (distribution) processing instead of print processing, by sequentially carrying out forwarding from the received image data, it is also possible to considerably shorten the required time which is from the start of the receiving of the image data to the completion of the forwarding of the image data of all pages.

After the Internet facsimile machine 1 at the transmitting side transmits all electronic mail formed per each page of the original, and the Internet facsimile machine 1A at the receiving side receives all of the electronic mail, the Internet facsimile machine 1A of the receiving side sends, to the Internet facsimile machine 1 at the transmitting side, reply electronic mail of the processing result of the image data received from the Internet facsimile machine 1 of the transmitting side. At this time, the Internet facsimile machine 1A at the receiving side transmits this reply electronic mail at the time of the completion of the printing of all the received image data, or at the time when a predetermined period of time has passed from the generation of the printing job of the image data of the last page.

Figure 4:
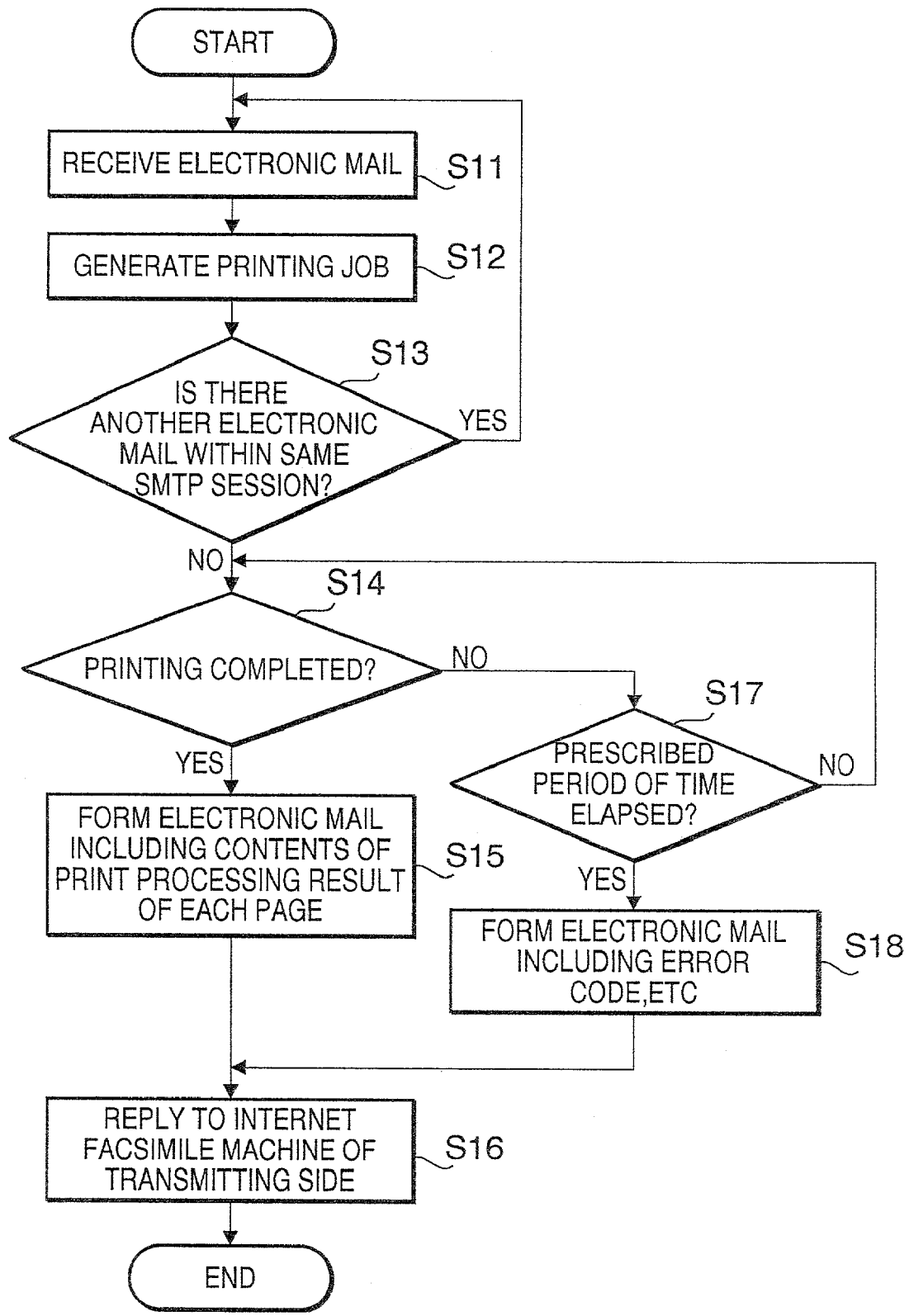
FIG. 4 is a flow chart showing the operation of the Internet facsimile machine (of the receiving side) according to the first embodiment of the present invention.
Figure 7:
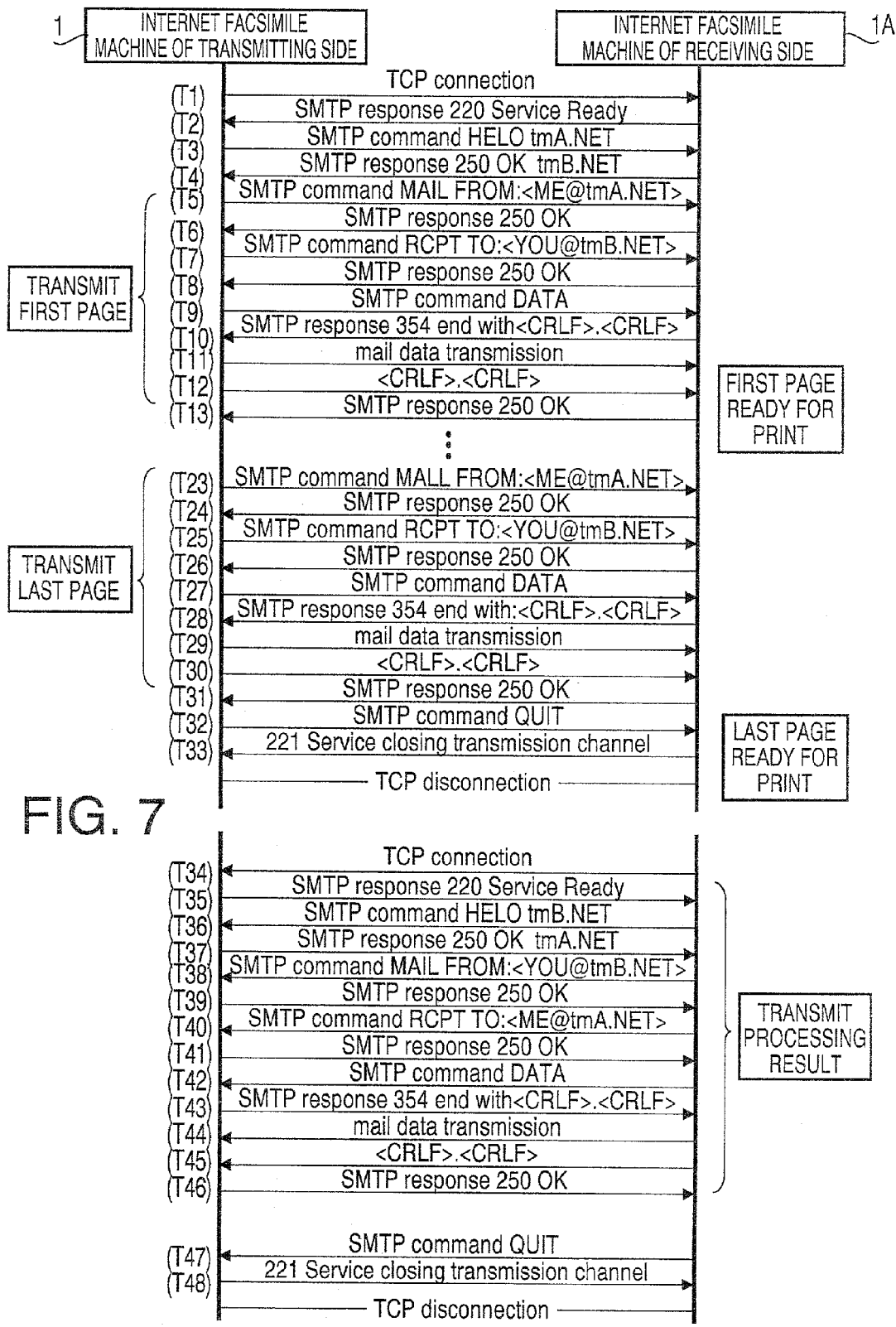
FIG. 7 is a sequence diagram showing the SMTP session carried out between the Internet facsimile machine (of the transmitting side) and the Internet facsimile machine (of the receiving side) according to the first embodiment of the present invention.

The operation of the Internet facsimile machine 1A of the receiving side at this time will be described in accordance with the flow chart shown in FIG. 4 and the sequence diagram shown in FIG. 7, together with aforementioned operation. The operation T1 through T33 of the sequence diagram shown in FIG. 7 corresponds to the operation T1 through T33 of the sequence diagram shown in FIG. 5.

First, when the Internet facsimile machine 1A of the receiving side receives the electronic mail having the attached image data of the first page of the original (in the step S11, T5 through T12), the printing job of the image data of the received first page is generated (in the step S12). Next, when there is another electronic mail within the same SMTP session, the processes of the steps S11, S12 are repeated. In this manner, each time the Internet facsimile machine at the receiving side receives each electronic mail, the printing job of the image data attached to the electronic mail is generated.

After that, the Internet facsimile machine 1A at the receiving side receives, from the Internet facsimile machine of the transmitting side 1, the SMTP command "QUIT" which designates the disconnection of the TCP connection, and thereby judges that there is not any other electronic mail within the same SMTP session (in the step S13, T32). Subsequently, the Internet facsimile machine 1A at the receiving side judges whether or not the print processing is completed for all pages of the received image data (in the step S14). When the print processing is completed, electronic mail is formed whose main text includes the contents of the print processing result per each page (in the step S15), and the formed electronic mail is transmitted to the Internet facsimile machine 1 at the transmitting side (in the step S16, T38 through T45). As information to be written in the main text of the electronic mail or the like, i.e., as the contents of the print processing result, for example, in the case where the printing has completed normally, "printing OK" is written in the main text of the electronic mail, and in the case of failing to carry out printing due to the lack of recording paper, the written information in the main text is "waiting for paper supply due to paper being running out".

When it is judged in the step S14 that the print processing is yet to be completed, for example, it is judged (in the step S17) whether or not a predetermined period of time has elapsed from the time the judgment of the step S13 is carried out. When the predetermined period of time has not elapsed yet, the procedure proceeds to the step S14. When the predetermined period of time has already elapsed, the electronic mail whose main text includes an error code or the like is formed, for example (in the step S18), and the Internet facsimile machine 1A at the receiving side sends this electronic mail to the Internet facsimile machine 1 at the transmitting side in order to notify it that the printing has been a failure (in the step S16, T34 through T46).

Second Embodiment

Next, according to a second embodiment of the present invention, an Internet facsimile communication method and an Internet facsimile machine for carrying out such a communication method will be described.

In one example, an Internet facsimile machine 1C of the transmitting side and an Internet facsimile machine 1D of the receiving side of the second embodiment are used in the network environment A shown in FIG. 2. That is, in the network environment A described in the first embodiment, the Internet facsimile machine 1C of the transmitting side according to the second embodiment is provided in place of the Internet facsimile machine 1 of the transmitting side, and the Internet facsimile machine 1D of the receiving side according to the second embodiment is provided in place of the Internet facsimile machine 1A of the receiving side.

The Internet facsimile machines 1C, 1D at the transmitting and receiving sides have the same hardware structure as the Internet facsimile machine 1 at the transmitting side of the first embodiment shown in FIG. 1. The Internet facsimile machine 1C at the transmitting side stores the data table 22 in the RAM 3 in the same manner as the Internet facsimile machine 1 of the transmitting side.

Figure 8:
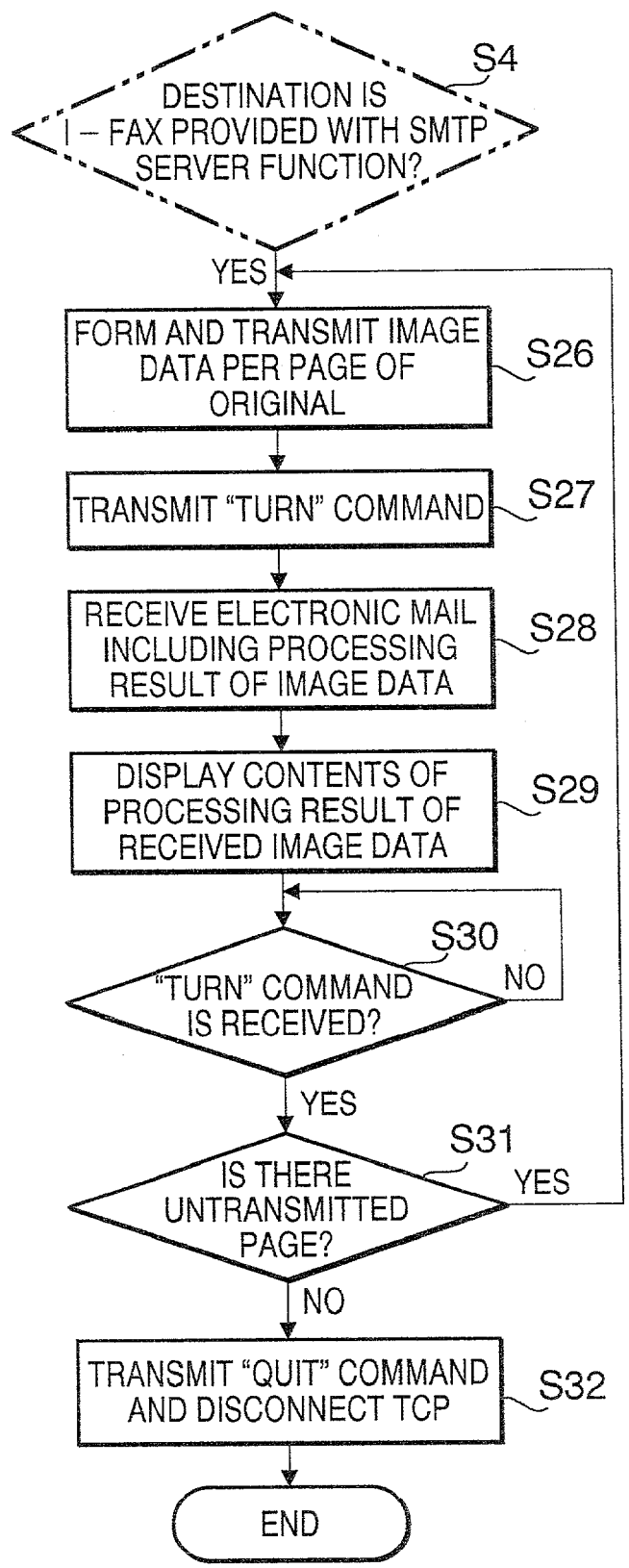
FIG. 8 is a flow chart showing the operation of the Internet facsimile machine (of transmitting side) according to a second embodiment of the present invention.
Figure 9:
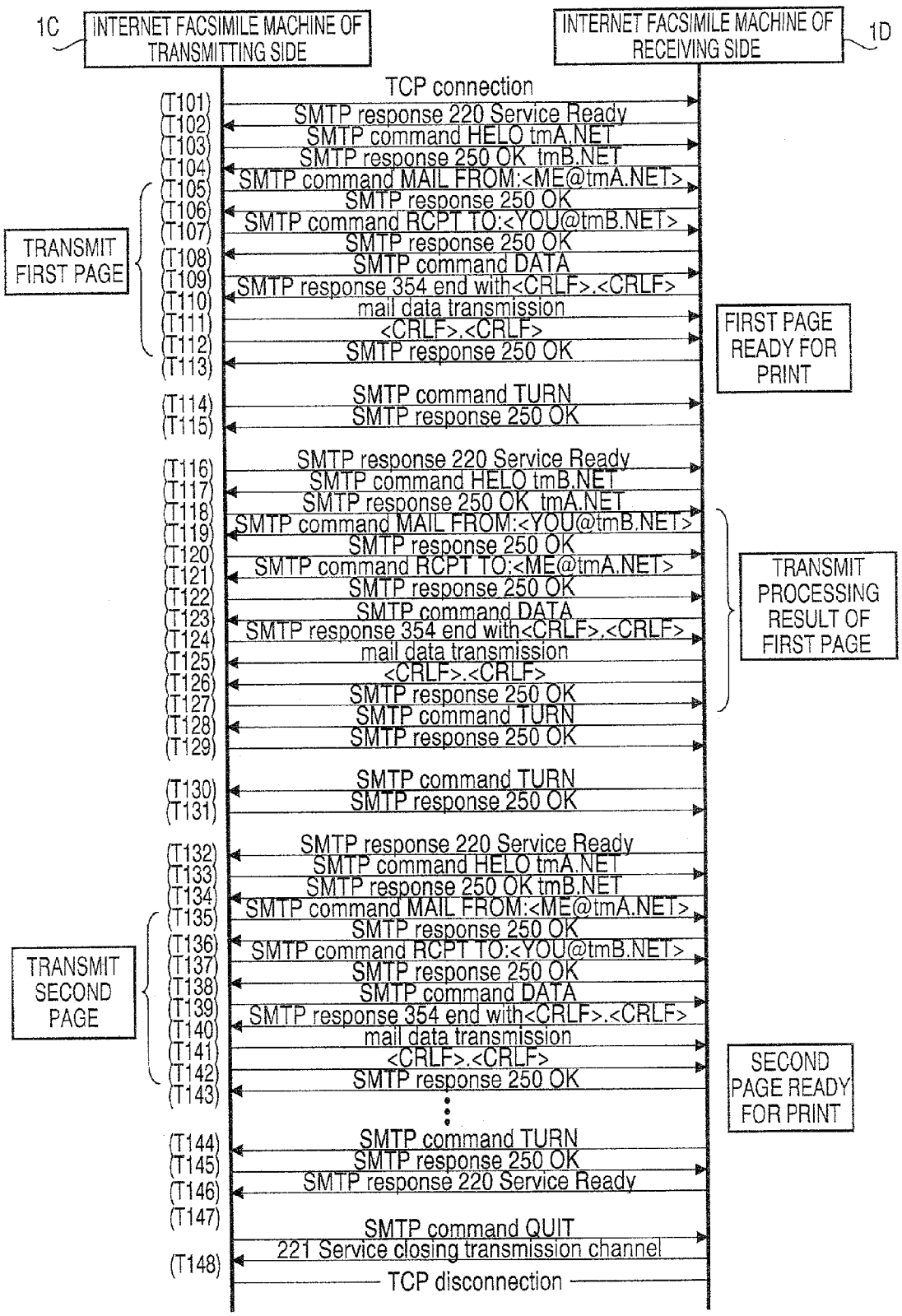
FIG. 9 is a sequence diagram showing the SMTP session carried out between the Internet facsimile machine (of the transmitting side) and the Internet facsimile machine (of the receiving side) according to the second embodiment of the present invention.
Figure 10:
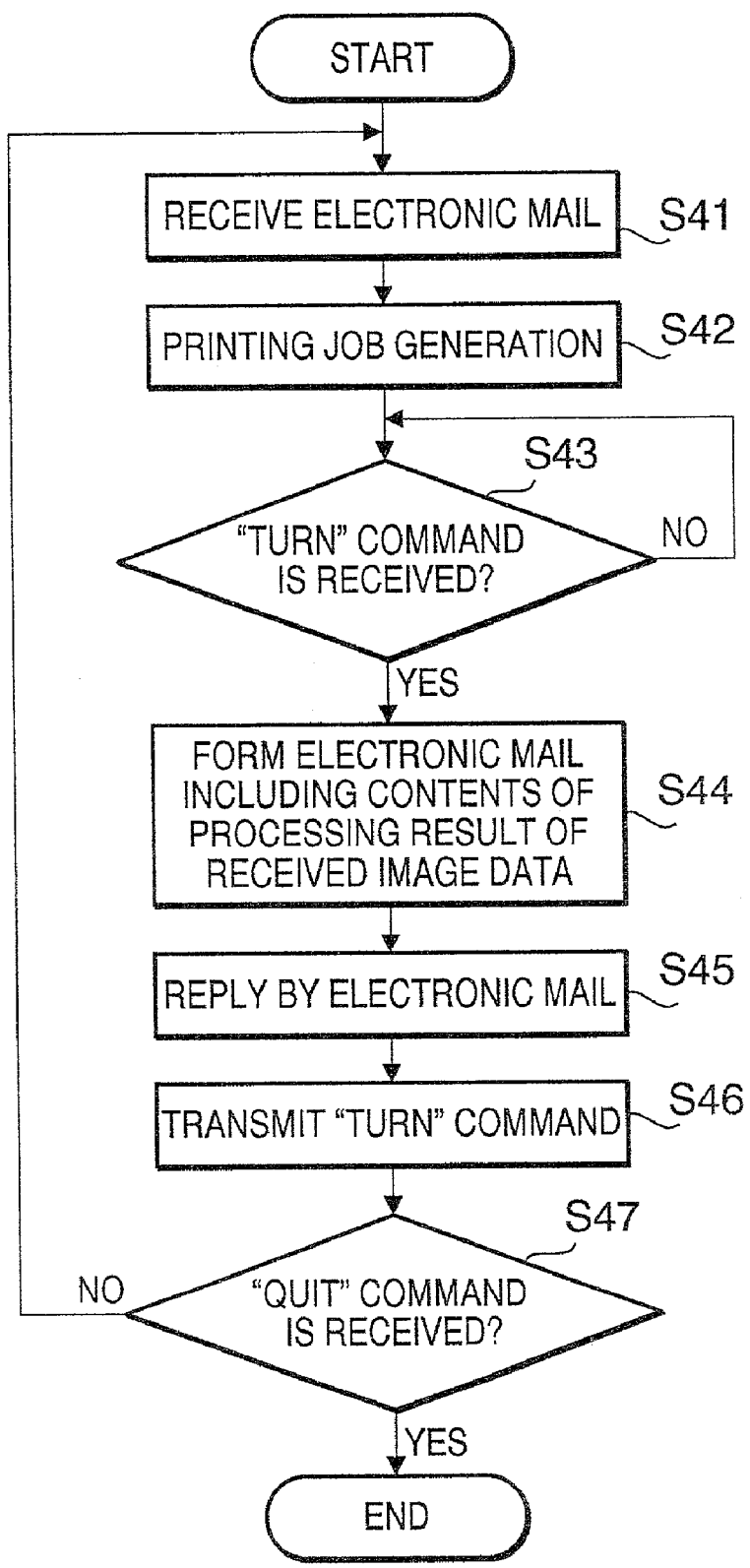
FIG. 10 is a flow chart showing the operation of the Internet facsimile machine (of the receiving side) according to the second embodiment of the present invention.

The following description based on the flow charts and the sequence diagram is directed to the operation when the Internet facsimile machine 1C at the transmitting side transmits data of a plurality of originals, and the operation of the Internet facsimile machine 1D at the receiving side which receives the data of the originals. The operation of the Internet facsimile machine 1C at the transmitting side will be described based on the flow chart shown in FIG. 8, the operation of the Internet facsimile machine 1D at the receiving side will be described based on the flow chart shown in FIG. 10, and the SMTP session to be carried out between the Internet facsimile machine 1C of the transmitting side and the Internet facsimile machine 1D of the receiving side will be described based on the sequence diagram shown in FIG. 9. Further, each operation to be described based on the flow chart is carried out by following a command generated by the CPU 2 based on a control program or the like stored in each ROM 4.

The operation carried out by the Internet facsimile machine 1C of the transmitting side differs in the process of the step S5 shown in FIG. 3 which shows the operation of the Internet facsimile machine 1 of the transmitting side in the first embodiment. The operation in other processes (the steps S1 through S4, and the step S6) carried by the I-FAX 1C (Internet facsimile machine 1C) is the same as that of FIG. 3. In other words, when the Internet facsimile machine 1C of the transmitting side judges that the destination is the Internet facsimile machine 1D of the receiving side provided with the SMTP server function, based on the attributes information of the data table 22, from the step S1 through the step S4, the Internet facsimile machine 1C of the transmitting side reads in the original, forms the image data of the first page of the original, and transmits the image data as an attached file of the electronic mail to the Internet facsimile machine 1D of the receiving side (in the step S26 of FIG. 8, and T105 through T112 of FIG. 9). The Internet facsimile machine 1C of the transmitting side receives the SMTP response "250", transmits the SMTP command "TURN" for exchanging the transmitting side and the receiving side (S27, T114), and the transmission right is transferred from the Internet facsimile machine 1C of the transmitting side to the Internet facsimile machine 1D of the receiving side. Further, the SMTP command for exchanging the transmission right in the manner stated above may be the SMTP command "ETRN", instead of the "TURN", and the SMTP command having the same function as the "TURN" command may be defined and used.

Then, the Internet facsimile machine 1D of the receiving side receives the electronic mail having the attached image data of the first page transmitted in S26 (S41 of FIG. 10), and generates the print job for the image data of the received electronic mail immediately (S42). Subsequently, when receiving the SMTP command "TURN" from the Internet facsimile machine 1C of the transmitting side (S43, T114), the Internet facsimile machine 1D of the receiving side forms the electronic mail having the written contents of the processing result of the received image data (S44), sends the reply electronic mail to the Internet facsimile machine 1C (S45, T119 through T126), and further transmits the SMTP command "TURN" to the Internet facsimile machine 1C of the transmitting side (S46, T128).

Then, when receiving the SMTP command "QUIT" from the Internet facsimile machine 1C of the transmitting side, the operation is completed, and on the other hand, when not receiving "QUIT", the operation of S41 through S47 is repeated until receiving the SMTP command "QUIT". In other words, until the Internet facsimile machine 1C of the transmitting side transmits the image data of all pages, each time the Internet facsimile machine 1D of the receiving side receives the electronic mail, the Internet facsimile machine 1D generates the print job for the image data attached to the electronic mail successively, and carries out the print processing of the received image data.

When the Internet facsimile machine 1C of the transmitting side receives the electronic mail having the written processing result of the image data from the Internet facsimile machine 1D of the receiving side (S28), the contents written in the main text or the like of the received electronic mail are printed out by the printing unit 9, or the contents are displayed on the display 10a or the like (S29).

When the Internet facsimile machine 1C of the transmitting side receives the SMTP command "TURN" transmitted from Internet facsimile machine 1D of the receiving side in S46 (S30), it is judged whether or not there is a remaining page whose image data has not been transmitted (S31). When it is judged that there is a page still remaining, the operation of S26 through S31 is repeated until transmitting all electronic mails (i.e., image data of all pages). On the other hand, when it is judged that there is no untransmitted pages in S31 (i.e., it is judged that the image data of all pages has been transmitted), the Internet facsimile machine 1C of the transmitting side transmits the SMTP command "QUIT", and the TCP disconnection is carried out (S32, T147).

Third Embodiment

Next, the Internet facsimile communication method and the Internet facsimile machine for carrying out this communication method according to a third embodiment of the present invention will be described.

The Internet facsimile machine 1E of the transmitting side and the Internet facsimile machine 1F of the receiving side in the third embodiment are used in, for example, the network environment A shown in FIG. 2. In other words, in the network environment A described in the first embodiment, the Internet facsimile machine 1E of the transmitting side of the third embodiment is provided in place of the Internet facsimile machine 1 of the transmitting side, and the Internet facsimile machine 1F of the receiving side of the third embodiment is provided in place of the Internet facsimile machine 1A of the receiving side.

The Internet facsimile machine 1E of the transmitting side and the Internet facsimile machine 1F of the receiving side have the same hardware structure as the Internet facsimile machine 1 of the transmitting side of the first embodiment shown in FIG. 1. Moreover, the Internet facsimile machine 1E of the transmitting side also stores the data table 22 within the RAM 3 in the same manner as the Internet facsimile machine 1 of the transmitting side.

Figure 11:
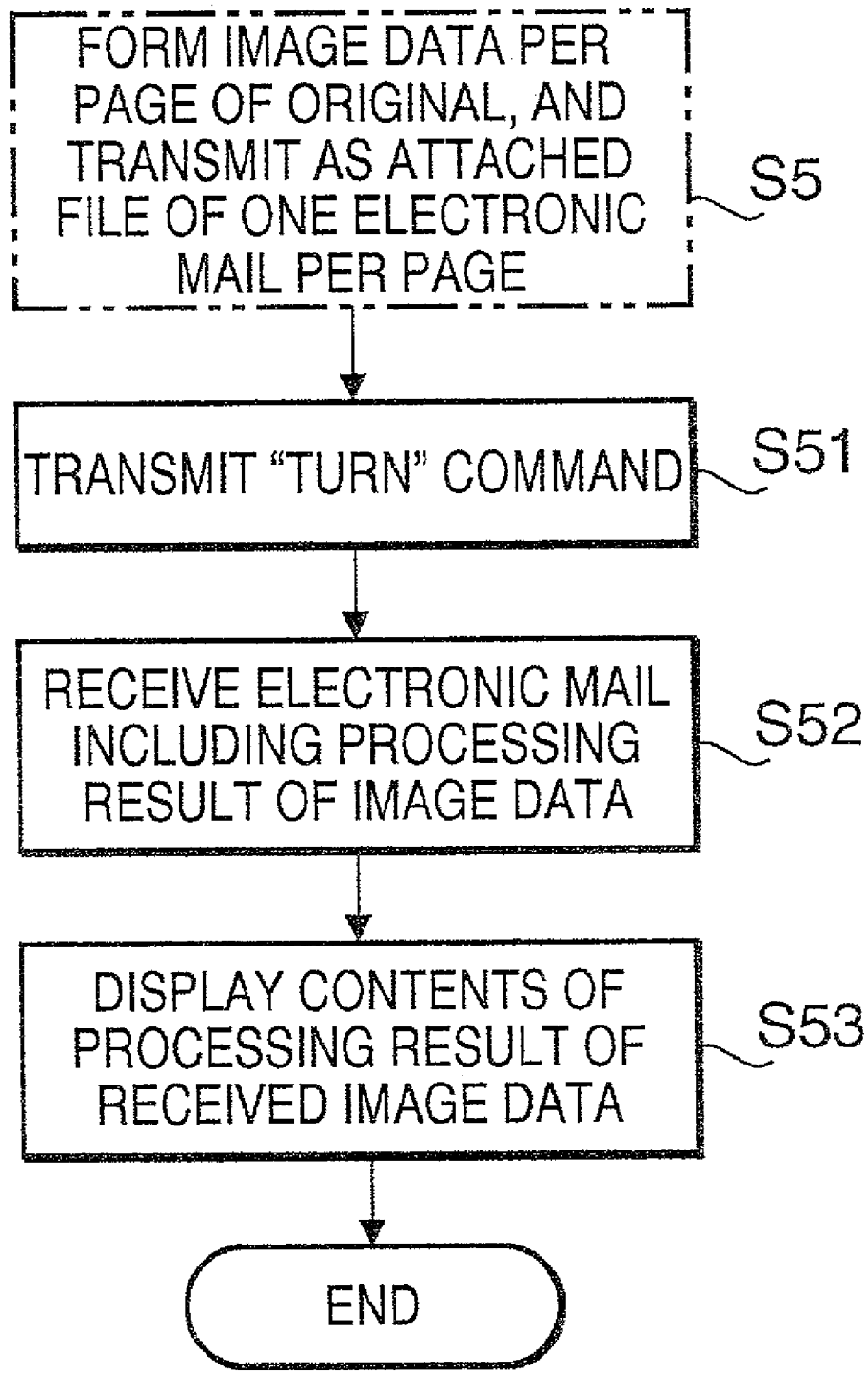
FIG. 11 is a flow chart showing the operation of the Internet facsimile machine (of the transmitting side) according to a third embodiment of the present invention.
Figure 12:
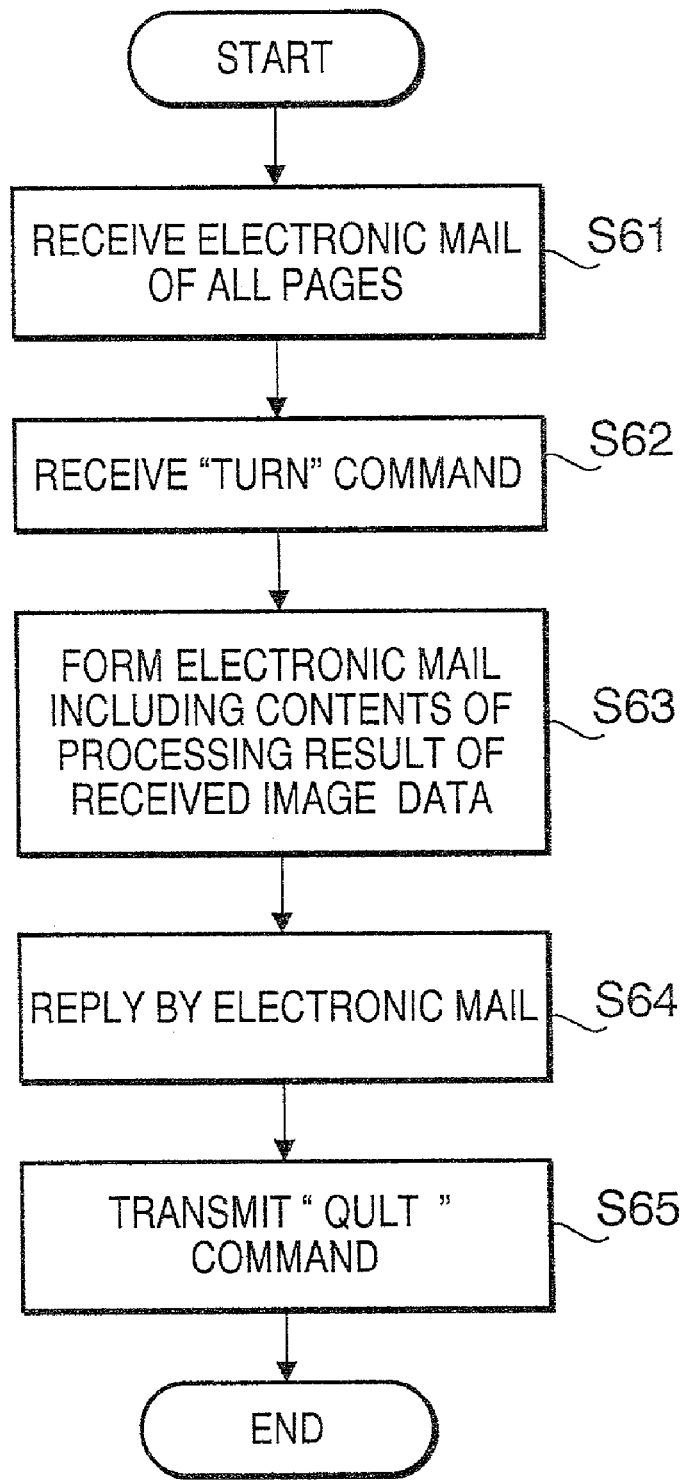
FIG. 12 is a flow chart showing the operation of the Internet facsimile machine (of the receiving side) according to the third embodiment of the present invention.
Figure 13:
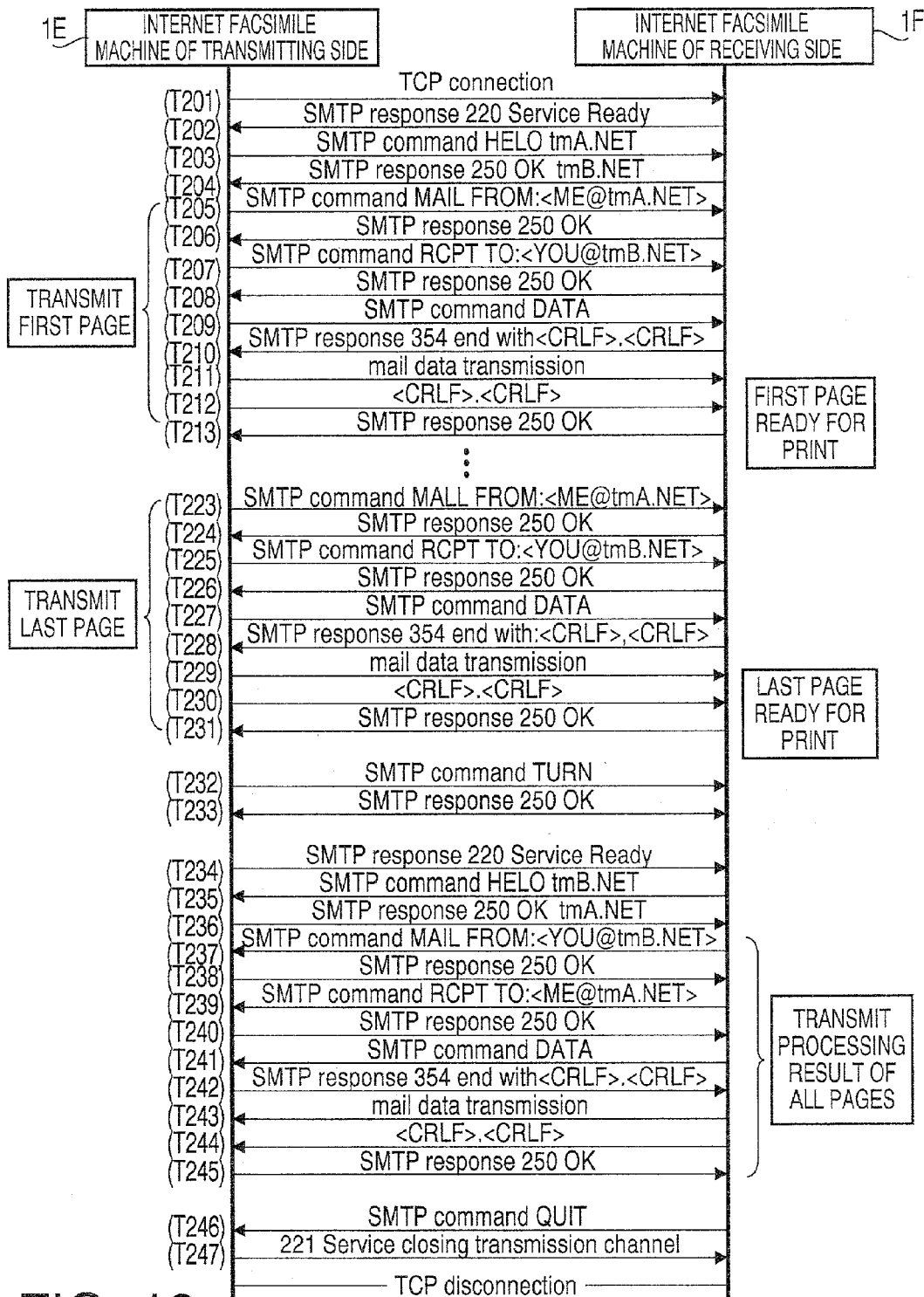
FIG. 13 is a sequence diagram showing the SMTP session carried out between the Internet facsimile machine (of the transmitting side) and the Internet facsimile machine (of the receiving side) according to the third embodiment of the present invention.

The following description based on the flow charts and the sequence diagram is the operation when the Internet facsimile machine 1E of the transmitting side transmits a plurality of originals, and the operation when the Internet facsimile machine 1F of the receiving side receives the originals. The operation of the Internet facsimile machine 1E of the transmitting side will be described based on the flow chart shown in FIG. 11, the operation of the Internet facsimile machine 1F of the receiving side will be described based on the flow chart shown in FIG. 12, and the SMTP session to be carried out between the Internet facsimile machines 1E and 1F will be described based on the sequence diagram shown in FIG. 13. Further, each operation to be described based on the flow chart is carried out by following the command generated by the CPU 2 based on the control program or the like stored in each ROM 4.

The operation carried out by the Internet facsimile machine 1E of the transmitting side is an operation having the processes S1 through S6 of FIG. 3 and additional processes after the step S5 of FIG. 3. That is, when judging that the destination is the Internet facsimile machine 1F of the receiving side provided with the SMTP server function, based on the attributes information in the data table 22, by undergoing the steps S1 through S4, the Internet facsimile machine 1E of the transmitting side, while forming the image data per each page of the originals, transmits the image data as the attached file of one electronic mail per each page successively. After transmitting all pages (S5, T201 through T231), the Internet facsimile machine 1E of the transmitting side transmits the SMTP command "TURN" (S51, T232), and transfers the transmission right of the Internet facsimile machine 1E of the transmitting side to the Internet facsimile machine 1F of the receiving side.

On the other hand, when the Internet facsimile machine 1F of the receiving side receives the electronic mails of all pages from the Internet facsimile machine of the transmitting side 1E (S61), and receives the SMTP command "TURN" transmitted in S51 from the Internet facsimile machine 1E of the transmitting side (S62, T232), the Internet facsimile machine 1F of the receiving side forms the electronic mail having the written contents of the processing result of the received image data (S63), sends the reply electronic mail to the Internet facsimile machine 1E of the transmitting side (S64, T237 through T244), and transmits the SMTP command "QUIT" at last (S65, T246) in order to carry out the TCP disconnection.

When the Internet facsimile machine 1E of the transmitting side receives the electronic mail having the written processing result of the received image data from the Internet facsimile machine 1F of the receiving side in S64 (S52, T235 through T244), the Internet facsimile machine 1E of the transmitting side carries out printing of the contents written in the main text or the like of the received electronic mail by the printing unit 9, or displays the contents on the display 10a or the like (S53).

Fourth Embodiment

Next, an Internet facsimile communication method and a Internet facsimile machine for carrying out this communication method according to a fourth embodiment of the present invention will be described in accordance with the drawings.

Figure 15:
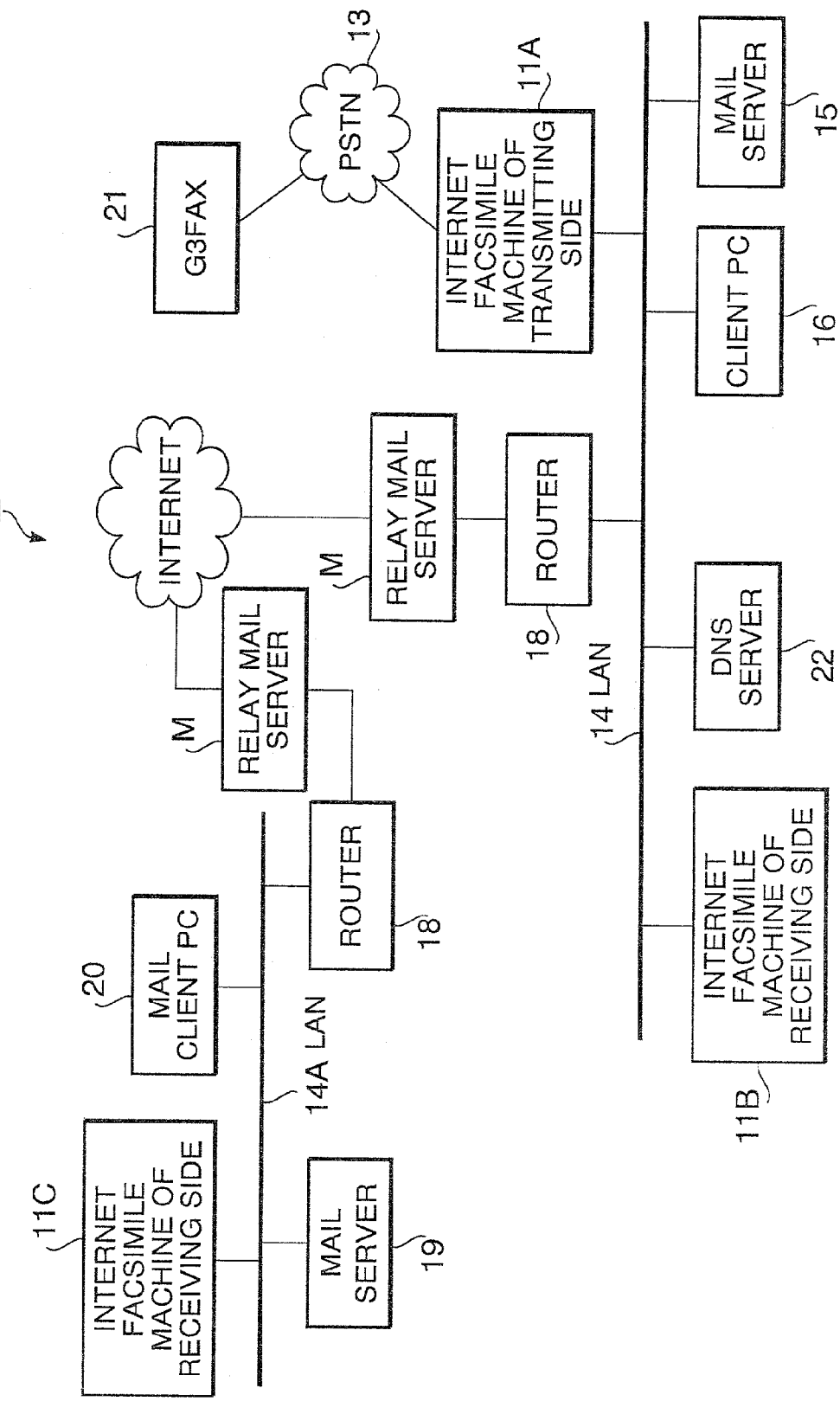
FIG. 15 is a block diagram showing an example of the network environment where the Internet facsimile machine (of transmitting side and receiving side) is provided according to a fourth embodiment of the present invention.

An Internet facsimile machine 11A of the transmitting side and an Internet facsimile machines 11B and 11C of the receiving side shown in FIG. 15 have the same hardware structure as the Internet facsimile machine 1. For the same parts with FIG. 2, same reference numerals are attached in FIG. 15, and the description of the same parts will be omitted.

Moreover, the data table T shown in FIG. 14 is stored in the designated storing area of the RAM 3 of the Internet facsimile machine 11A of the transmitting side. The data table T stores information concerning "name of the other end", "destination", and "attributes" for each "speed dial number". When designating each "speed dial number", the Internet facsimile machine 11A of the transmitting side designates the destination corresponding to the "speed dial number" from the "destination" section, and further obtains the attributes information stored in the "attributes" section. For example, when the speed dial number "001" is designated, the Internet facsimile machine 11A of the transmitting side designates "YOU@tmB.NET" as the destination, and at the same time, obtains the attributes information that the terminal of the destination is the "Internet facsimile machine with the SMTP server function", in other words, the information that the terminal of the destination is the specific Internet facsimile machine 11B of the receiving side provided with the SMTP server function. In the data table T, the attributes information is stored in the "attributes" section for the speed dial number "001" and "004", the attributes information is not stored in the "attributes" section for the speed dial number "002", "003", "005", and terminals other than the Internet facsimile machine 11B of the receiving side are provided in the destinations relating to these speed dial numbers.

The Internet facsimile machine 11A of the transmitting side and the Internet facsimile machine 11B of the receiving side are provided and used in the network environment A or the like shown in FIG. 15. In other words, the Internet facsimile machine 11A of the transmitting side is connected capable of carrying out the communication reciprocally with the mail server 15, the client PC 16, the Internet facsimile machine 11B of the receiving side, the router 18, the DNS (Domain Name System) server 22 or the like, through the LAN 14. In addition to that, through the relay mail server M, the Internet, and the relay mail server M, the Internet facsimile machine 11A of the transmitting side is capable of carrying out the communication with the mail server 19, the mail client PC 20 under the control of the mail server 19, and another Internet facsimile machine 11C which is the same machine as the Internet facsimile machine 11B of the receiving side, which are connected to another LAN 14A. Furthermore, the Internet facsimile machine 11A of the transmitting side is cap able of transmitting and receiving the image data of the G3 format to and from a G3 FAX terminal 21 through a PSTN (Public Switched Telephone Network) 13. Further, when there is an inquiry of the domain name of the mail server of the destination mail address from the Internet facsimile machine 11A of the transmitting side, the DNS server 22 detects the domain name and the IP address, and sends back the domain name and the IP address to the Internet facsimile machine 11A of the transmitting side.

The following description based on the sequence diagrams and the flow charts shown in FIGS. 16 through 23 is the operation of the Internet facsimile machine 11A of the transmitting side and the Internet facsimile machine 11B of the receiving side when the image data scanned by the scanning unit 8, or the image data received from the outside is transmitted (forwarded or distributed) from the Internet facsimile machine 11A of the transmitting side. Further, the operation to be described based on these sequence diagrams and flow charts is carried out in accordance with the command generated by the CPU 2 based on the control program or the like stored in each ROM 4 of the Internet facsimile machine 11A of the transmitting side and the Internet facsimile machine 11B of the receiving side.

Figure 16:
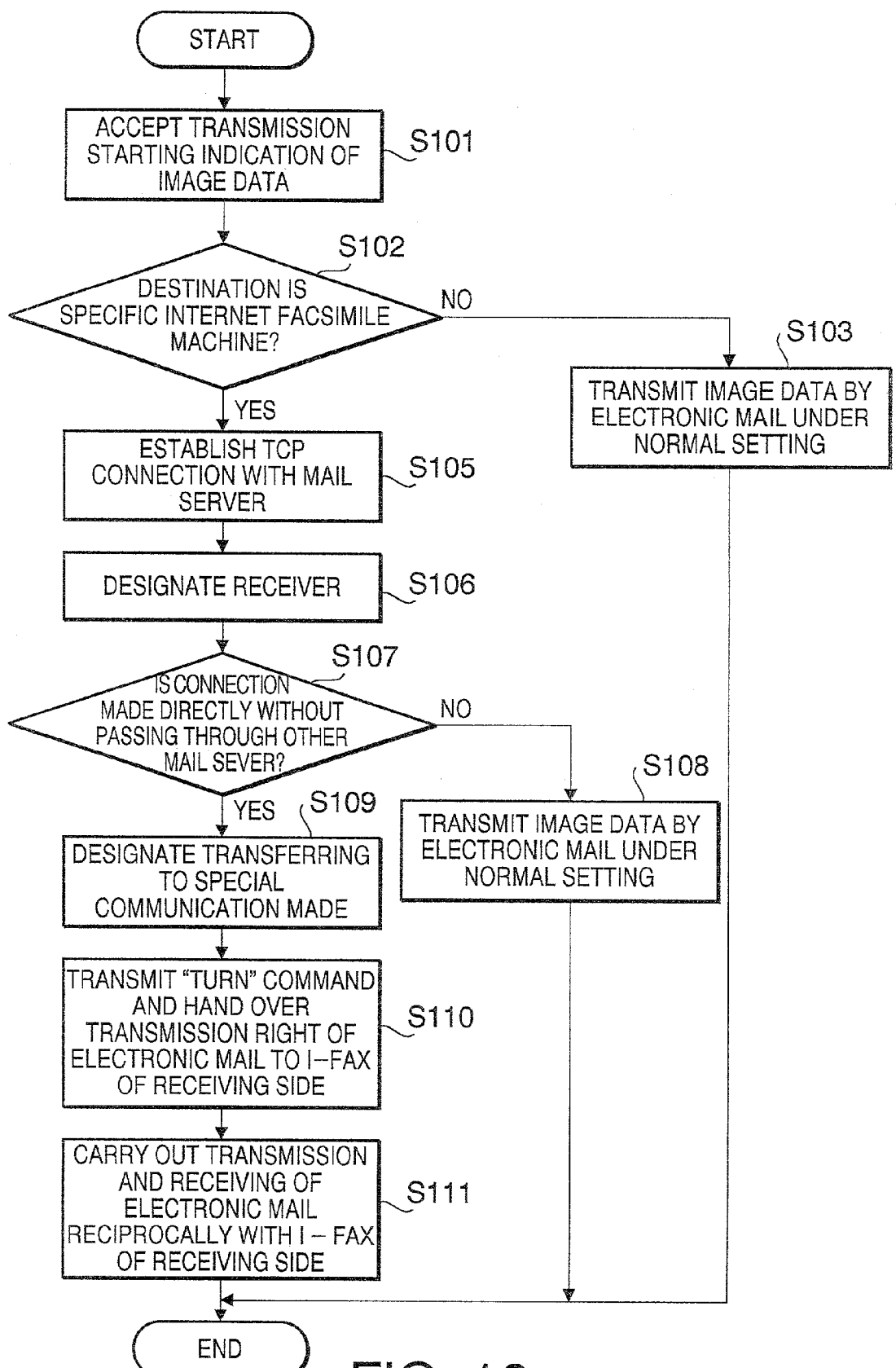
FIG. 16 is a flow chart showing the operation of the Internet facsimile machine (of the transmitting side) according to the fourth embodiment of the present invention.

First, when the transmission start of the image data is indicated, for example, by the operation of the operation unit 10 by the operator, or by a forwarding/distributing setting device for the received image data, as shown in the flow chart shown in FIG. 16, the Internet facsimile machine 11A of the transmitting side accepts the indication of the transmission start (step S101), and judges whether or not the destination is a specific Internet facsimile machine based on the data table T, in other words, whether or not the destination is the Internet facsimile machine 11B of the receiving side (step S102). For example, when it is judged that the destination is not the Internet facsimile machine 11B of the receiving side, as in the case where the speed dial number "002" is designated, the image data is transmitted to the destination "123@def.co.jp" by electronic mail, under the normal setting (step S103).

Figure 17:
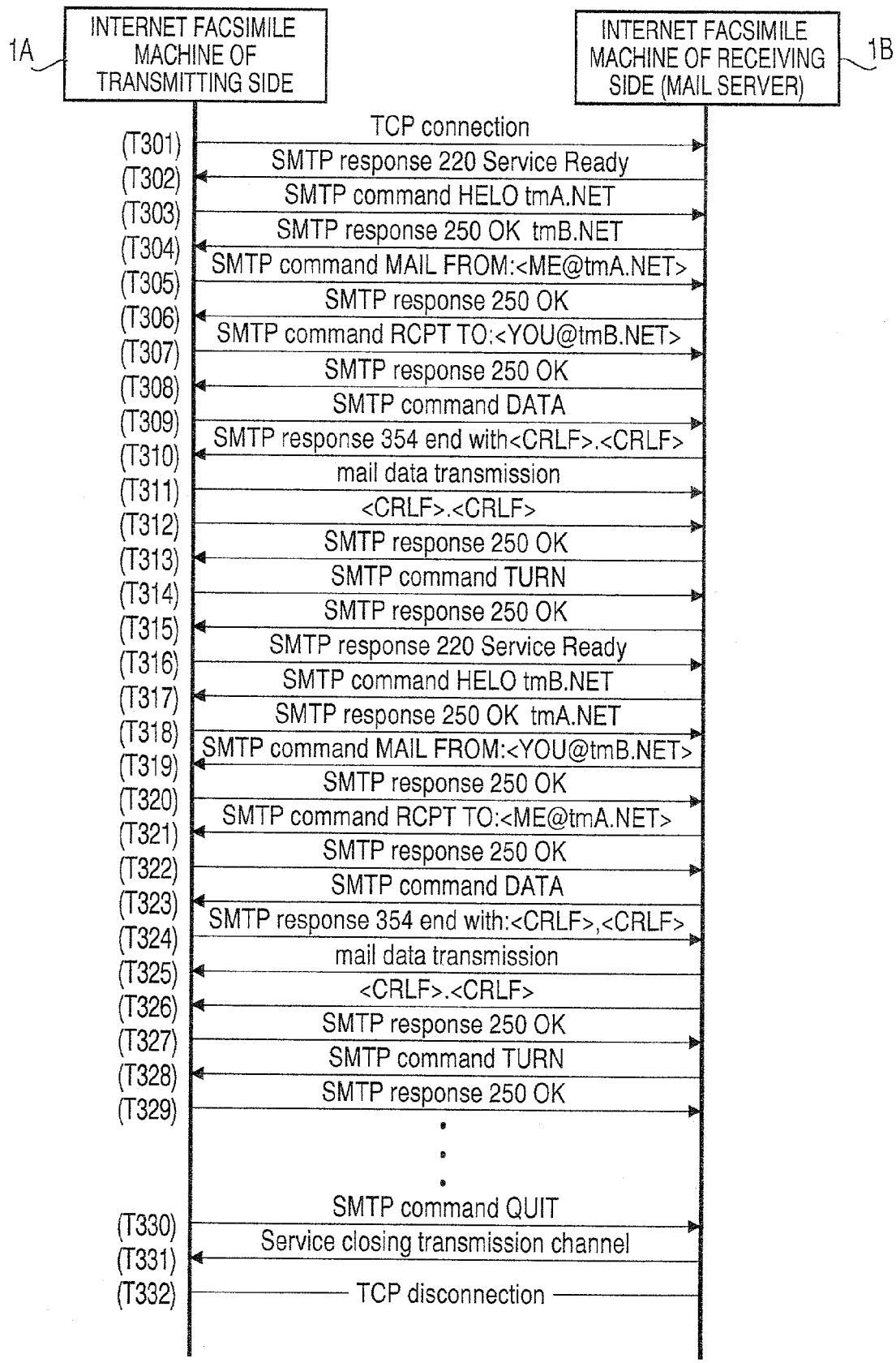
FIG. 17 is a sequence diagram showing one SMTP session carried out between the Internet facsimile machine (of the transmitting side) and the Internet facsimile machine (of the receiving side) according to the fourth embodiment of the present invention.
Figure 18:
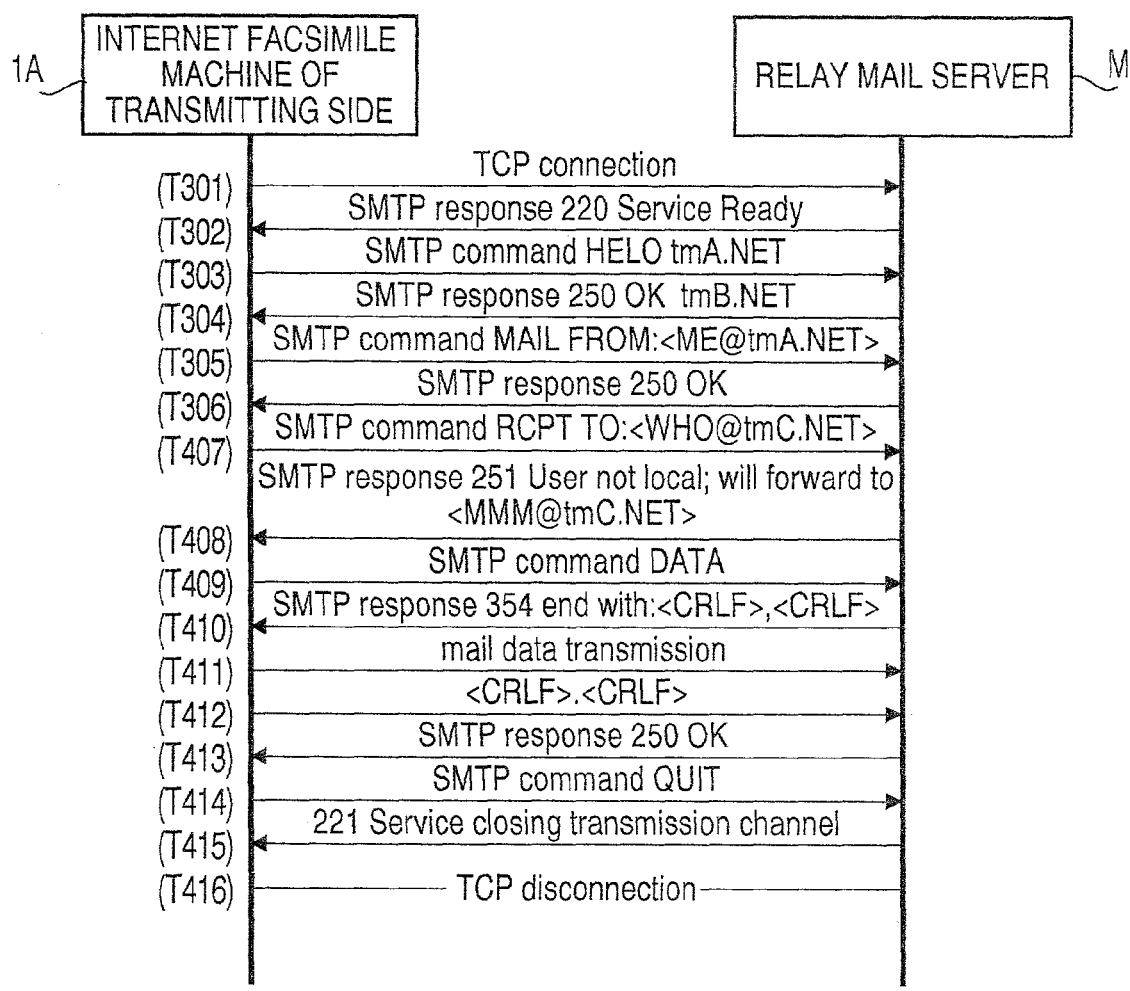
FIG. 18 is a sequence diagram showing the SMTP session carried out between the Internet facsimile machine (of the transmitting side) and another mail server (relay server) according to the fourth embodiment of the present invention.
Figure 19:
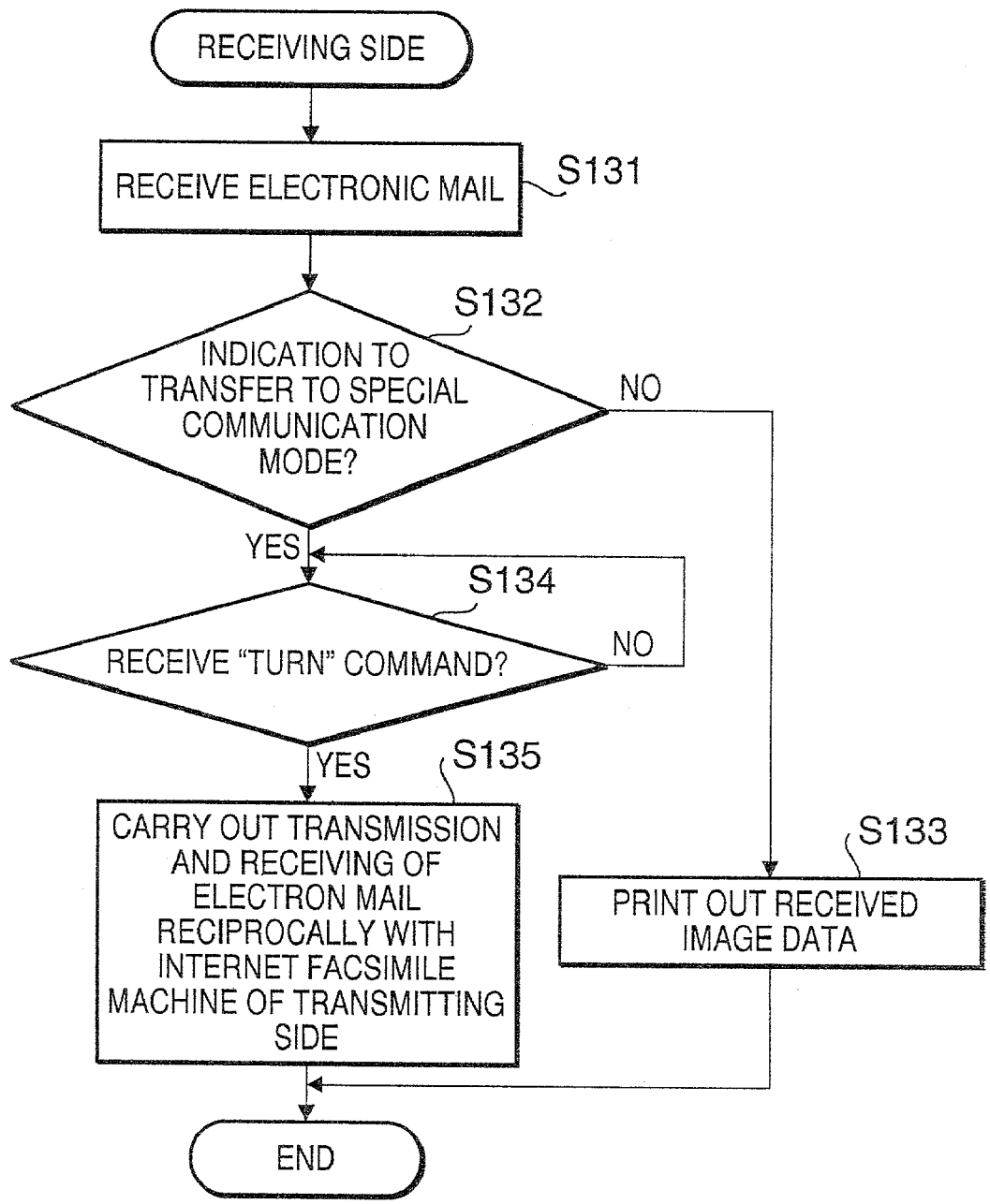
FIG. 19 is a flow chart showing the operation of the Internet facsimile machine (of the receiving side) according to the fourth embodiment of the present invention.

Then, when it is judged that the destination is the Internet facsimile machine 11B of the receiving side, as in the case where the speed dial number "001" is designated, as shown in the sequence diagrams of FIGS. 17 and 18, a TCP connection demand is first carried out to one of the mail servers in order to transmit the electronic mail, the connection is established (step S105, T301 through T302), and the Internet facsimile machine 11A of the transmitting side designates itself by the SMTP command "HELO tmA.NET" to the connected mail server. In this case, "tmA.NET" which is a parameter is specified as a domain name of the Internet facsimile machine 11A of the transmitting side. In response to this, the mail server returns the SMTP response code "250", and specifies "tm.B.NET" which is its own domain name, as a parameter (T303, T304). The SMTP response code "250" is a response code showing the fact that the processing of the demanded SMTP command has been completed.

Next, the Internet facsimile machine 11A of the transmitting side specifies its own mail address "ME@tmA.NET" by the SMTP command "MAIL FROM:<ME@tmA.NET>" (T305), and specifies the receiver by the SMTP command such as "RCPT TO: <YOU@tmB.NET>", or "RCPT TO:<WHO@tmC.NET>" (step S106, T307, T407). When the mail address of the mail server which received such an SMTP command is the specified "YOU@tmB.NET", in other words, when the mail server is the receiver, the mail server sends back the SMTP response code (command) "250" showing such a fact to the Internet facsimile machine 11A of the transmitting side (T308). When the mail address of the mail server is not designated "WHO@tmC.NET", as shown in FIG. 18, the mail server sends back, to the Internet facsimile machine 11A of the transmitting side, the SMTP response code (command) "251" to the effect that the electronic mail to be received will be forwarded to the destination "MMM@tmC.NET" (T408).

When receiving the SMTP response code "250", the Internet facsimile machine 11A of the transmitting side judges that the connection has been made directly with the Internet facsimile machine 11B of the receiving side without passing through another mail server or without passing through other mail servers. On the other hand, when receiving the SMTP response code "251", the Internet facsimile machine 11A of the transmitting side judges that the connected mail server is the relay mail server M and that the connection has not been made directly with the Internet facsimile machine 11B of the receiving side (the step S107; connection destination judging step).

In S107, when judging that the Internet facsimile machine 11A of the transmitting side was not connected directly to the Internet facsimile machine 11B of the receiving side without passing through another mail server or without passing through other mail servers, the Internet facsimile machine 11A of the transmitting side transmits the image data to the destination by electronic mail under normal setting (step S108, T409 through T416). For example, in the case where another Internet facsimile machine 11C of the receiving side is the destination, the communication is to be carried out via the relay mail server M.

In S107, when judging that the Internet facsimile machine 11A of the transmitting side is connected directly to the Internet facsimile machine 11B of the receiving side without passing through another mail server or without passing through other mail servers, the transmission of the electronic mail is subsequently designated by the SMTP command "DATA", the Internet facsimile machine 11A receives the SMTP response code "354 end with <CRLF>.<CRLF>", then transmits the electronic mail having the designated written command to the Internet facsimile machine 11B of the receiving side, and it is designated to proceed to a special communication mode. The Internet facsimile machine 11A of the transmitting side further transmits the line "<CRLF>.<CRLF>" ("CRLF" shows start of a new line) which includes only a period ".", and it is designated to terminate the transmission of the electronic mail (step S109, T309 through T312). Then, the Internet facsimile machine 11A of the transmitting side transmits the SMTP command "TURN" for exchanging the transmitting side and the receiving side, and the transmission right of the electronic mail (transmission right of the SMTP command) is passed to the Internet facsimile machine 11B of the receiving side (step S110, T314).

Then, by repeating a series of SMTP procedure shown in T303 through T315 while exchanging the transmission right between the Internet facsimile machines 11A and 11B, the transmission and reception of the electronic mail is carried out reciprocally (step S111). Further, the SMTP command for exchanging the transmission right may be the STMP command "ETRN", instead of the "TURN", and an SMTP command having the same function as the "TURN" command may be defined and used.

The Internet facsimile machine 11B at the receiving side is a communication partner of the Internet facsimile machine 11A at the receiving side which carries out the aforementioned operation. As shown in the flow chart of FIG. 19, when the Internet facsimile machine 11B of the receiving side receives the electronic mail (step S131), and then judges whether or not proceeding to a special communication mode is designated, based on whether or not the command for designating the proceeding to the special communication mode is written in the electronic mail (step S132). When it is judged that proceeding to the special communication mode is not designated, the Internet facsimile machine 11B of the receiving side, for example, carries out printing of the received image data (step S133). When it is judged that proceeding to the special communication mode is designated, the Internet facsimile machine 11B of the receiving side waits for transmission of the SMTP command "TURN" from the Internet facsimile machine 11A of the transmitting side (step S134), and after the Internet facsimile machine 11B receives the SMTP command "TURN", transmission and reception of electronic mail between the Internet facsimile machines 11A and 11B is carried out reciprocally by repeating a series of SMTP processes shown in T303 through T315 while exchanging of the transmission right is performed (step S135).

Figure 20:
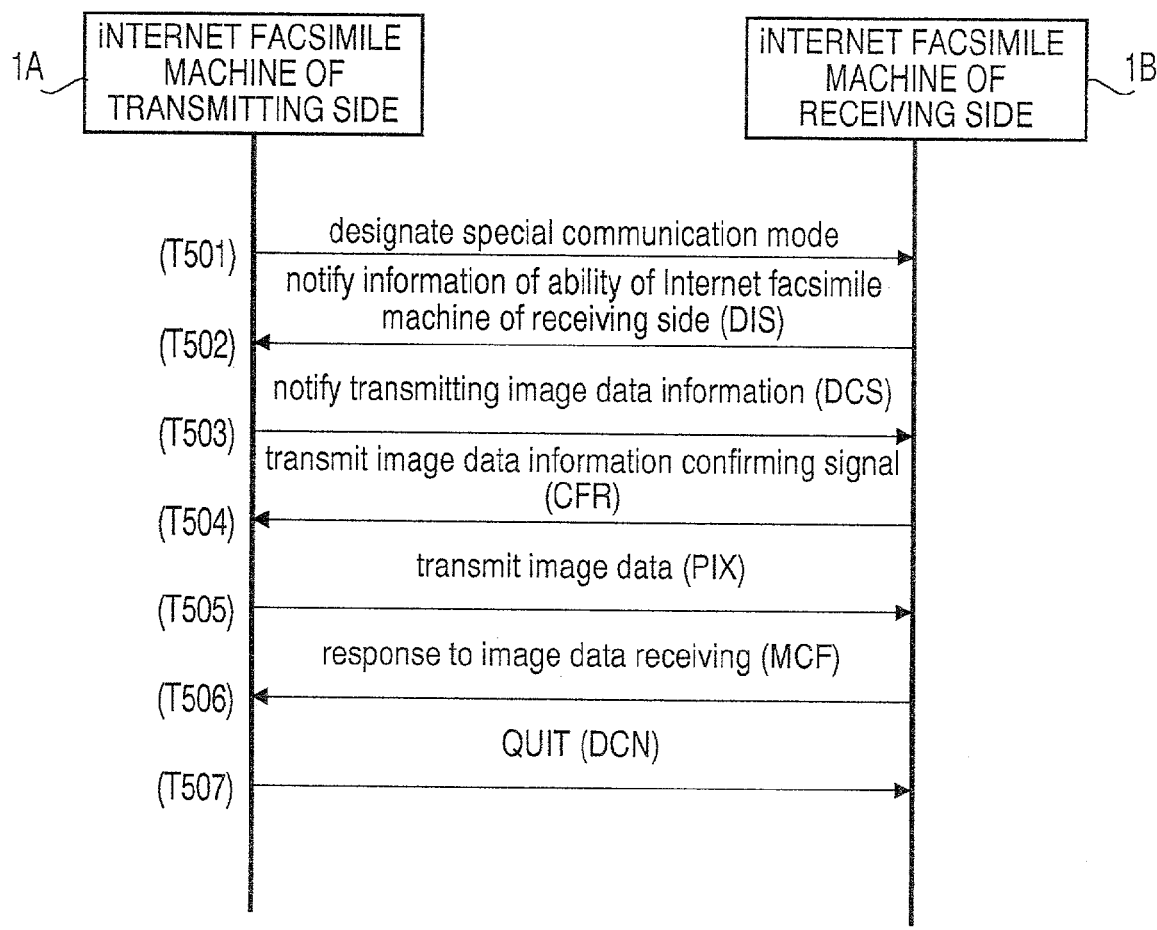
FIG. 20 is a sequence diagram showing the transmission and reception of the electronic mail, SMTP command, or the like which are carried out between the Internet facsimile machine (of the transmitting side) and the Internet facsimile machine (of the receiving side) according to the fourth embodiment of the present invention.
Figure 21:
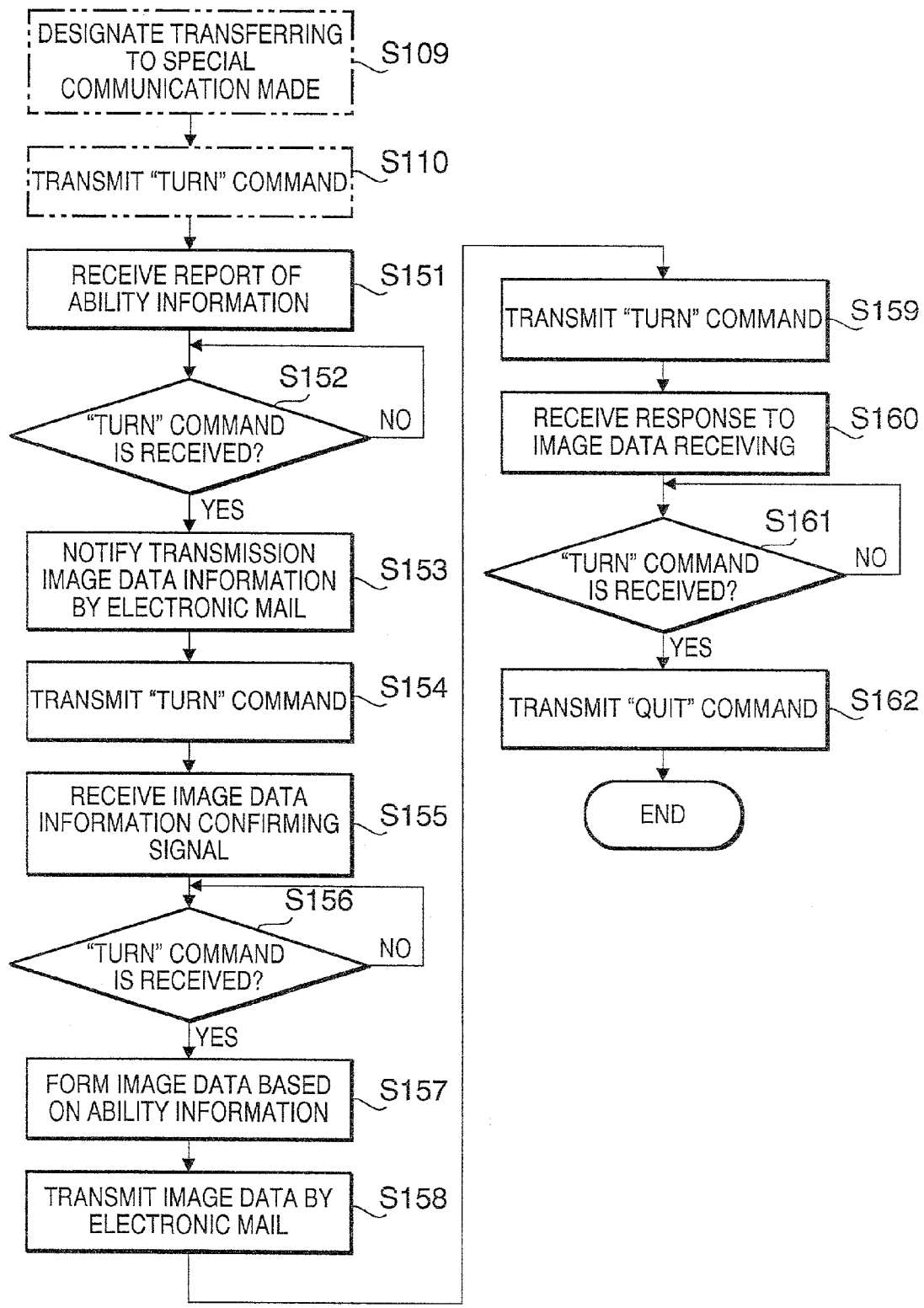
FIG. 21 is a flow chart showing the operation of the Internet facsimile machine (of the transmitting side) according to the fourth embodiment of the present invention.
Figure 22:
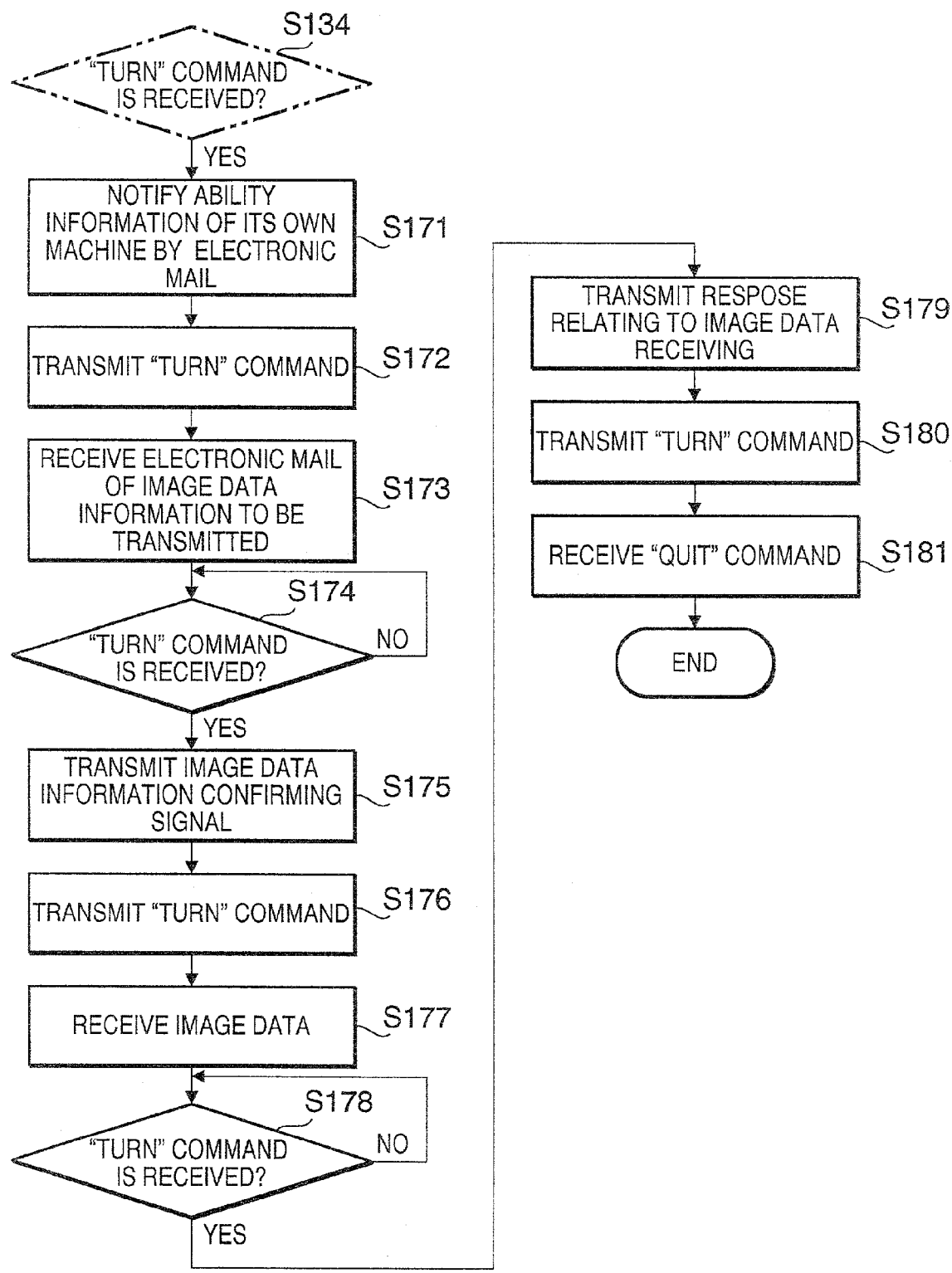
FIG. 22 is a flow chart showing the operation of the Internet facsimile machine (of the receiving side) according to the fourth embodiment of the present invention.

Next, the operation in S1 of the Internet facsimile machine 11A of the transmitting side and the operation of S135 of the Internet facsimile machine 11B of the receiving side will be described in further detail, based on the sequence diagram shown in FIG. 20, and the flow charts shown in FIG. 21 and FIG. 22.

In S109, the Internet facsimile machine 11A of the transmitting side transmits the electronic mail having the written prescribed command to designate the proceeding to the special communication mode to the Internet facsimile machine 11B of the receiving side (step S109, T501). Subsequently, the Internet facsimile machine 11A of the transmitting side transmits the SMTP command "TURN" (step S110), and passes the transmission right of the electronic mail to the Internet facsimile machine 11B of the receiving side.

On the other hand, the Internet facsimile machine 11B receives the designation of the proceeding to the special communication mode from the Internet facsimile machine 11A of the transmitting side, by electronic mail. Subsequently, the Internet facsimile machine 11B of the receiving side accepts the transmission right of the electronic mail by receiving the SMTP command "TURN" (step S134). For example, the Internet facsimile machine 11B of the receiving side then forms the electronic mail having the written its own ability information (information concerning the ability relating to receiving, printing, or the like), and transmits this electronic mail in order to notify its own ability information to the Internet facsimile machine 11A of the transmitting side (step S171, T502). After that, the Internet facsimile machine 11B of the receiving side transmits the SMTP command "TURN", and hands the transmission right of the electronic mail to the Internet facsimile machine 11A of the transmitting side (step S172).

Meanwhile, when the Internet facsimile machine 11A is notified of the ability information by electronic mail from the Internet facsimile machine 11B of the receiving side (step S151), and accepts the transmission right by receiving the SMTP command "TURN" (step S152), the Internet facsimile machine 11A of the transmitting side determines a format of the resolution, the paper size, or the like of the image data to be transmitted, based on the ability information, and forms the electronic mail having the information of the data of the determined format (hereinafter, referred to as the "transmission image data information"). The Internet facsimile machine 11A transmits the electronic mail having the transmission image data information to the Internet facsimile machine 11B of the receiving side in order to notify the Internet facsimile machine 11B of the transmission image data information (step S153, T503). Subsequently, the Internet facsimile machine 11A of the transmitting side transmits the SMTP command "TURN", and hands the transmission right of the electronic mail to the Internet facsimile machine 11B of the receiving side (step S154).

On the other hand, the Internet facsimile machine 11B of the receiving side receives the notification of the transmission image data information by electronic mail from the Internet facsimile machine 11A of the transmitting side (step S173). Furthermore, when receiving the transmission right by receiving the SMTP command "TURN" (step S174), the Internet facsimile machine 11B transmits the image data information confirming signal to the effect that the received transmission image data information has been confirmed (step S175, T504). After that, the Internet facsimile machine 11B of the receiving side transmits the SMTP command "TURN", and passes the transmission right of the electronic mail to the Internet facsimile machine 11A of the transmitting side (step S176).

Meanwhile, the Internet facsimile machine 11A of the transmitting side receives the image data information confirming signal by electronic mail from the Internet facsimile machine 11B of the receiving side (step S155). When receiving the transmission right by receiving the SMTP command "TURN" (step S156), the Internet facsimile machine 11A of the transmitting side forms the image data of the format determined based on the ability information (step S157), and transmits the image data to the Internet facsimile machine 11B of the receiving side (step S158, T505). In addition, the Internet facsimile machine 11A of the transmitting side transmits the SMTP command "TURN", and passes the transmission right of the electronic mail to the Internet facsimile machine 11B of the receiving side (step S159).

On the other hand, the Internet facsimile machine 11B of the receiving side receives the image data transmitted from the Internet facsimile machine 11A of the transmitting side (step S177). When receiving the transmission right by receiving the SMTP command "TURN" (step S178), the Internet facsimile machine of the receiving side 11B forms the electronic mail having the information concerning the response to the image data reception, and transmits, by the electronic mail, the response concerning the image data reception to the Internet facsimile machine 11A of the transmitting side (step S179, T506). Subsequently, the Internet facsimile machine 11B of the receiving side transmits the SMTP command "TURN", and the transmission right is passed to the Internet facsimile machine 11A of the transmitting side (step S180).

At the transmitting side, the Internet facsimile machine 11A receives the response concerning the image data by the electronic mail from the Internet facsimile machine 11B of the receiving side (step S160). In addition, after receiving the transmission right by receiving the SMTP command "TURN" (step S161), the Internet facsimile machine 11A of the transmitting side transmits the SMTP command "QUIT" (step S162, T507 (T330)).

After that, the Internet facsimile machine 11B of the receiving side receives the SMTP command "QUIT" transmitted from the Internet facsimile machine 11A of the transmitting side (step S181), sends back the response code "221" relating to the SMTP command (T331) (FIG. 17), and the TCP disconnection is carried out.

According to the Internet facsimile communication method to be carried out between the Internet facsimile machines 11A and 11B, the Internet facsimile machine 11A of the transmitting side and the Internet facsimile machine 11B of the receiving side exchange various data by transmitting and receiving of the electronic mail between them within one SMTP session. Therefore, the Internet facsimile machine 11A of the transmitting side can transmit the image data appropriately by grasping the ability of the Internet facsimile machine 11B of the receiving side, and it is also possible to shorten the communication time.

Moreover, according to the Internet facsimile communication method to be carried out by the Internet facsimile machines 11A and 11B, it is possible to realize the procedure similar to the electrical transmission control procedure of the facsimile standardized as the ITU-T Recommendation T. 30. For example, the notification of the ability information in T502 corresponds to "DIS (Digital Identifying Signal)" of the Recommendation T.30, the notification of the transmission image data information in T503 corresponds to "DCS (Digital Command Signal)" of the Recommendation T.30, the transmission of the image data information confirming signal in T504 corresponds to "CFR (Confirmation to Receive)" of the Recommendation T.30, the transmission of the image data in T505 corresponds to "PIX (image signal)" of the Recommendation T.30, the response to the image data reception in T506 corresponds to "MCF (Message Confirmation)" of the Recommendation T.30, and the transmission of the SMTP command "QUIT" in T507 corresponds to "DCN (Disconnect)" of the Recommendation T.30.

Fifth Embodiment

Figure 23:
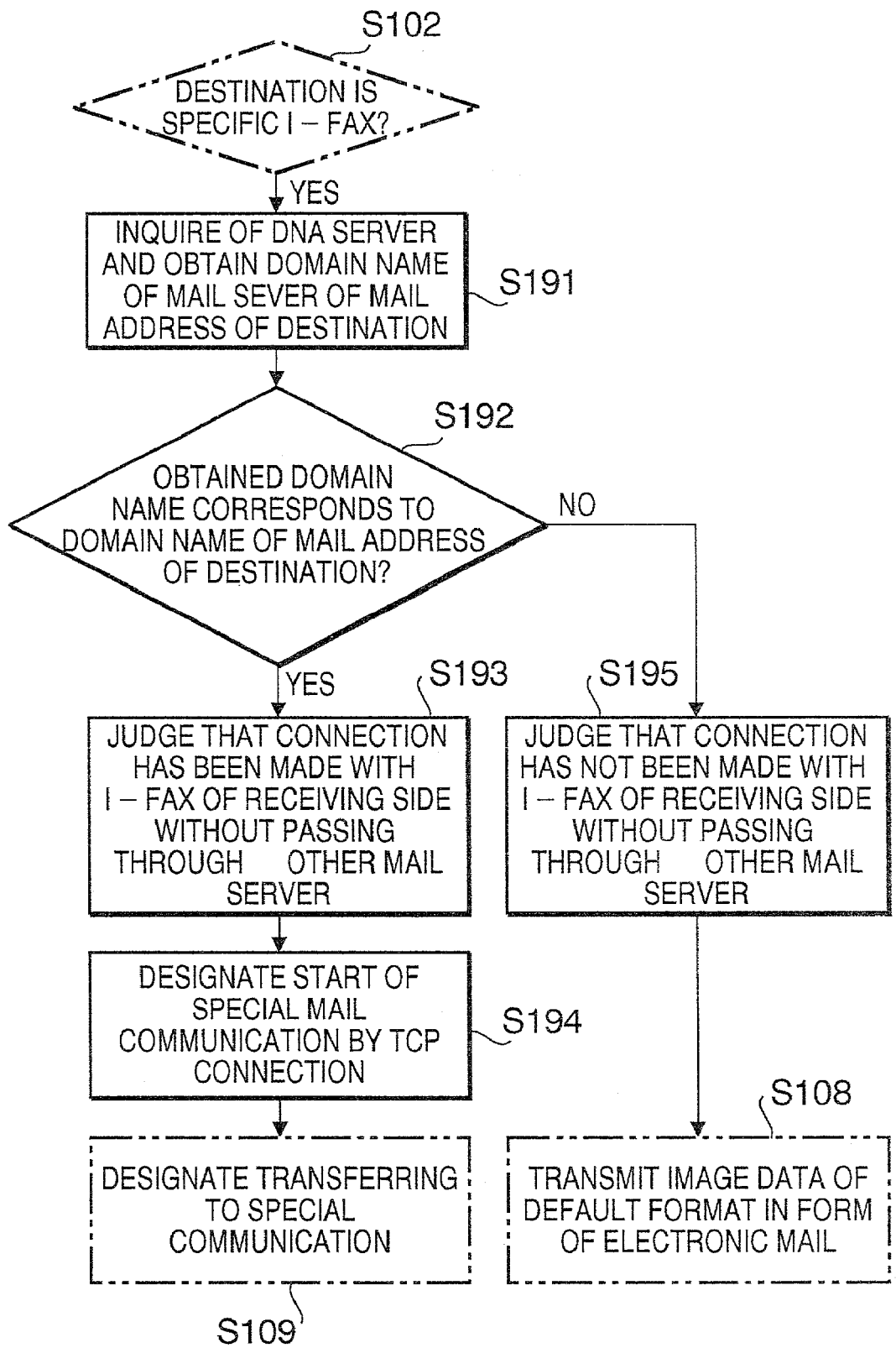
FIG. 23 is a flow chart showing the operation of the Internet facsimile machine (of the transmitting side) according to a fifth embodiment of the present invention.

Next, a fifth embodiment of the present invention will be described, based on the flow chart of FIG. 23. The fifth embodiment differs from the fourth embodiment in the judging manner by which it is judged whether or not the Internet facsimile machine 11A of the transmitting side is connected directly to the Internet facsimile machine 11B of the receiving side without passing through another mail server or without passing through other mail servers. Further, the operation to be described based on the flow chart is carried out by following the command generated by the CPU 2 based on the control program or the like stored in the ROM 4 of the Internet facsimile machine 11A of the transmitting side.

The Internet facsimile machine 11A of the transmitting side according to the fifth invention differs in the following point in the flow chart shown in FIG. 16 of the fourth embodiment. That is, after the step (step S102) for judging whether or not the destination is the specific facsimile machine 11B, the Internet facsimile machine 11A of the transmitting side asks the DNS server 19, and obtains the domain name of the mail server of the destination mail address (step S191), and judges whether or not the obtained domain name of the mail server corresponds to the domain name of the destination mail address (step S192). In the case where the two domain names correspond to each other, the domain name of the destination mail address is the domain name of the final destination, and the Internet facsimile machine 11A of the transmitting side judges that the connection is made with Internet facsimile machine 11B of the receiving side without passing through another mail server or without passing through other mail servers (step S193), establishes the TCP connection with the Internet facsimile machine 11B of the receiving side (step S194), and designates the proceeding to the special communication mode (step S109). Meanwhile, in S192, in the case where the obtained domain name of the mail server and the domain name of the destination mail address do not correspond to each other, the domain name of the destination mail address is not the domain name of the final destination, and the Internet facsimile machine 11A of the transmitting side judges that the connections have not been made with the Internet facsimile machine 11B of the receiving side without passing through another mail server or without passing through other mail servers (step S195).

According to the Internet facsimile machine communication method to be carried out by the Internet facsimile machine of the fifth embodiment, the Internet facsimile machine 11A of the transmitting side can obtain, even from outside the SMTP session, the information which is used for judging whether or not the connection has been made directly with the Internet facsimile machine 11B of the receiving side without passing through another mail server or without passing through other mail servers.

Sixth Embodiment

Figure 24:
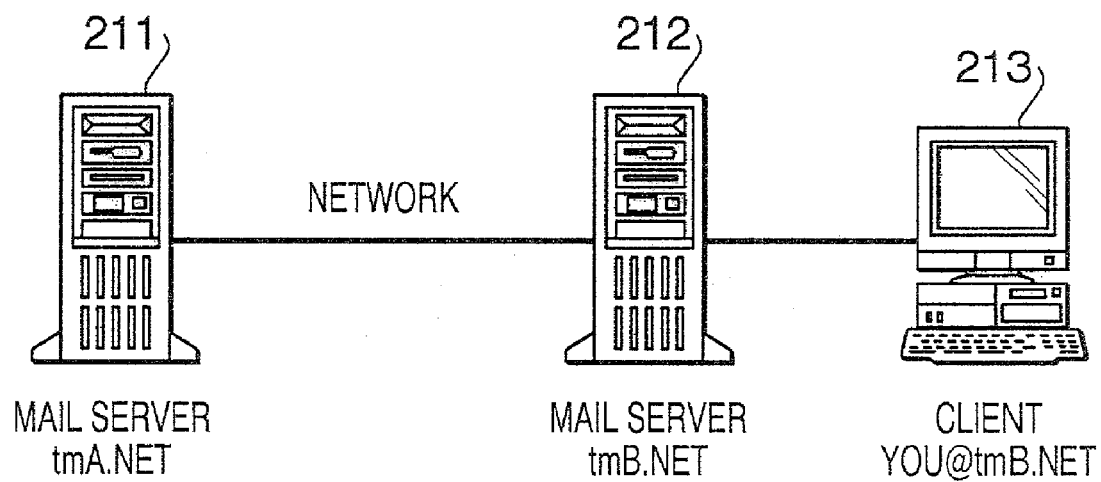
FIG. 24 is a block diagram showing a sixth embodiment of the communication system of the present invention.

FIG. 24 is a block diagram showing a sixth embodiment of the present invention. In the drawing, reference numerals 211, 212 designate mail servers, and 213 a client. The mail server 211 and the mail server 212 can carry out forwarding of the electronic mail by the SMTP to each other. It is assumed that the electronic mail is forwarded from the mail server 211 to the mail server 212.

The mail server 211 receives the electronic mail from the client within the same domain or another mail server, and carries out the distribution of the received electronic mail or the electronic mail whose transmitter is the mail server 211 itself. For example, the electronic mail addressed to the domain to which the mail server 212 belongs is forwarded to the mail server 212.

There are cases in which the demand for the delivery confirmation is added to the electronic mail to be forwarded. Alternatively, the delivery confirmation demand can be added to the electronic mail when forwarding the electronic mail. For example, when forwarding the electronic mail with the delivery confirmation demand by the DSN, in the case where the forwarding destination is the mail server within the domain including the client which is the destination of the electronic mail, it is possible to receive the delivery confirmation directly from the mail server of the forwarding destination. In such a case, the mail server 211 forwards the electronic mail with the delivery confirmation demand to such a mail server, and then transmits the transmission right reversing command. While maintaining this session, the mail server receives the electronic mail showing the delivery confirmation from the mail server of the forwarding destination. In this manner, it is possible to shorten a required period of time from the time the electronic mail with the delivery confirmation demand is forwarded to the time the delivery confirmation concerning the electronic mail is transmitted.

Further, since the forwarding destination of the electronic mail is the mail server within the domain including the client of the destination of the electronic mail, it is possible to transmit the transmission right reversing command and receive the delivery confirmation by the DSN, after the electronic mail is transmitted. The judgment whether or not the forwarding destination of the electronic mail is such a mail server can be carried out based on the response from the DNS (Domain Name System) server or the like. In case where the IP address of the mail server of the forwarding destination is registered in advance, such judgment can be made from the registered IP address.

Moreover, even in the case where the forwarding destination of the electronic mail is the mail server within the domain including the client of the destination of the electronic mail, when transmitting the transmission right reversing command, it is not certain that the delivery confirmation is to be returned by the DSN. The judgment whether or not the delivery confirmation will be returned by the DSN can be made, based on whether or not the IP address of the mail server of the forwarding destination is registered in advance in the manner stated above. Alternatively, the judgment can be made by referring to the information of a specific field in the electronic mail, or in the case where the transmitter is its own machine, the judgment can be made by receiving indication from the user of its own machine.

The mail server 212 is also provided with a function similar to the mail server 211. For example, the mail server 212 receives the electronic mail from another mail server such as the mail server 211 or the client, and carries out the distribution of the electronic mail. For example, the electronic mail addressed to the client 213 is distributed to the client 213 by following the protocol such as POP (Post Office Protocol) 3, in accordance with the demand from the client 213 to extract the electronic mail.

When receiving the electronic mail addressed to its own machine or addressed to the domain including its own machine, in the case where the delivery confirmation demand is attached to the electronic mail, this machine transmits the electronic mail of the delivery confirmation concerning the received electronic mail. When the machine receives the electronic mail, and then receives the transmission right reversing command, in the case where the electronic mail is addressed to its own machine or addressed to the domain including its own machine, the session is maintained as it is, and this machine transmits the electronic mail of the delivery confirmation. As a result, it is possible to reduce the required time from the time the electronic mail is received to the time the electronic mail of the delivery confirmation is transmitted.

Furthermore, when receiving the transmission right reversing command after forwarding the electronic mail with the delivery confirmation demand, the decision of whether or not to return the delivery confirmation can be made by, for example, registering the IP address of the destination in advance and judging whether or not the destination is the registered destination. Alternatively, the machine may be constructed such that when receiving the transmission right reversing command, if the delivery confirmation is demanded, the machine transmits the electronic mail of the delivery confirmation, regardless of the destination.

Figure 25:
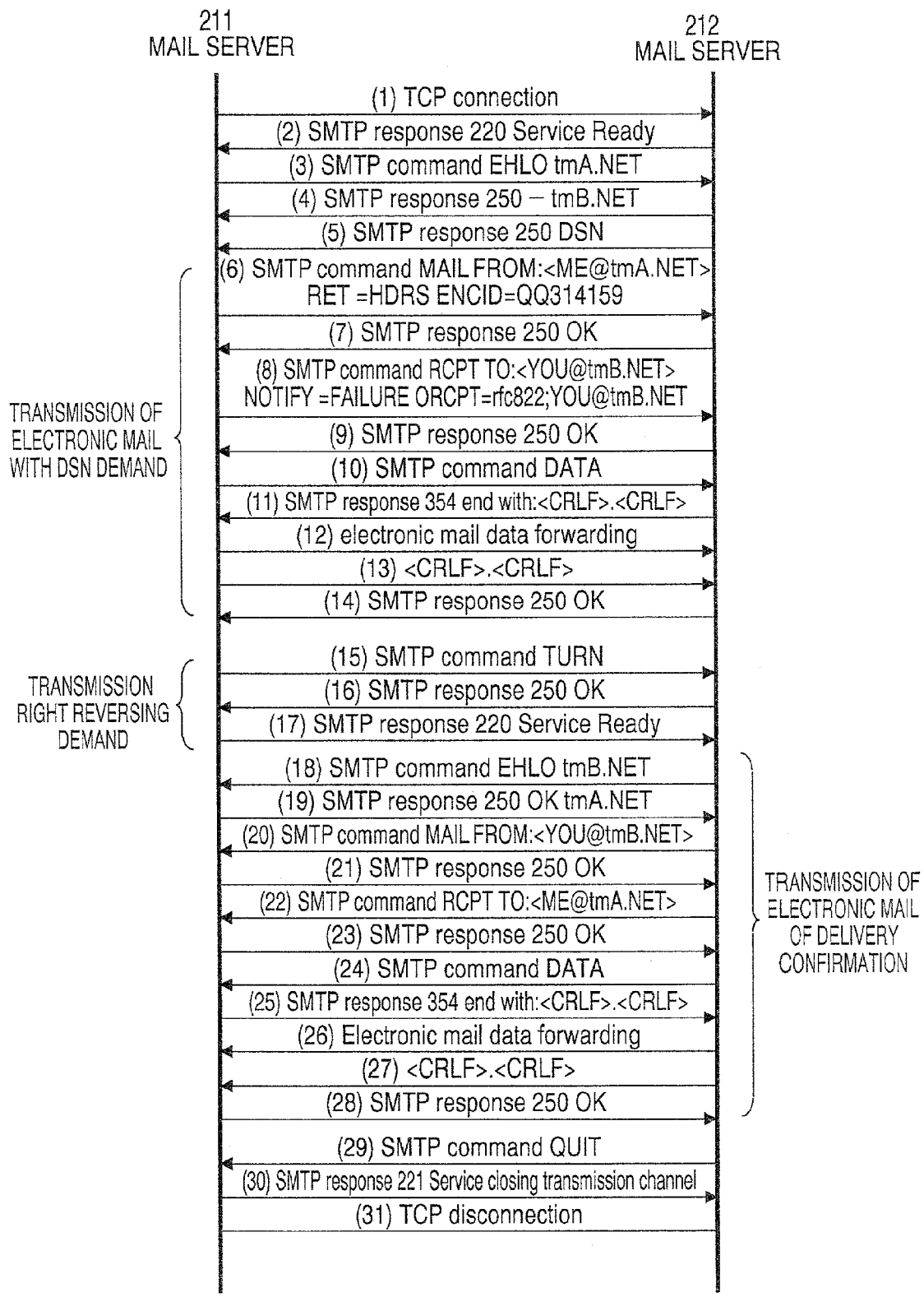
FIG. 25 is a view showing a specific example of the communication procedure according to the sixth embodiment of the communication system of the present invention.

FIG. 25 is an illustration showing a specific example of the communication procedure according to a sixth embodiment of the present invention. In the example of FIG. 25, the mail server 211 forwards, by the SMTP, the electronic mail having DSN demand addressed to the client which is located within the domain of the mail server 212. Further, in this example, the domain name of the mail server 211 is "tmA.NET", and the domain name of the mail server 212 is "tmB.NET". Moreover, the address of the transmitter of the electronic mail is "ME@tmA.NET", and the address of the destination is "YOU@tmB.NET".

First in the process (1) of FIG. 25, the mail server 211 tries TCP connection with the mail server 212 by using the IP address of the mail server 212. When the TCP connection is established in the process (2), "Service Ready" of the SMTP response (the number 220) is returned from the mail server 212. The mail server 211 notifies the domain name "tmA.NET" of the mail server 211 to the mail server 212 by the SMTP command EHLO in the process (3). In response to this, the mail server 212 notifies the domain name "tmB.NET" of the mail server 212 to the mail sever 211 by the SMTP response (the number 250) in the process (4). In the process (5), the mail server 212 notifies that the mail server 212 has the ability of the DSN to the mail server 211 by the SMTP response (the number 250).

Subsequently, in the process (6), the mail server 211 notifies, to the mail server 212, that the transmitter of the electronic mail is "ME@tmA.NET" by the SMTP command, and in the process (8), the mail server 211 notifies, to the mail server 212, that the destination is "YOU@tmB.NET". At this time, various kinds of the information concerning the DSN is forwarded, after each of the commands. Moreover, when receiving the information normally in the processes (7) and (9), the mail server 212 returns "OK" to the SMTP command by the SMTP response (the number 250).

After that, in the process (10), the mail server 211 transmits the SMTP command DATA to the mail server 212, and after "end with <CRLF>.<CRLF>" as a terminator is returned from the mail server 212 by the SMTP response (the number 354) in the process (11), the mail server 211 transmits the actual electronic mail data in the process (12). Finally in the process (13), the mail server 211 transmits "<CRLF>.<CRLF>" which is to be the terminator. When reception is carried out normally, the mail server 212 returns "OK" by the SMTP response (the number 250) in the process (14), and a series of the forwarding of the electronic mail is completed.

At this time, the mail server 211 sends the SMTP command TURN to the mail server 212 in the process (15). The command is the transmission right reversing command for transferring the transmission right to the mail server 212 while maintaining the session. The mail server 212 returns "OK" by the SMTP response (the number 250) in the process (16) as a response to the SMTP command TURN.

In turn, since the mail server 211 becomes the receiving side, in the process (17), the mail server 211 transmits "Service Ready" to the mail server 212 by the SMTP response (the number 220) so as to notify that the mail server 211 can receive the electronic mail. After that, by the same procedure as aforementioned forwarding of the electronic mail, the electronic mail of the delivery confirmation by the DSN is to be forwarded from the mail server 212 to the mail server 211. That is, in the process (18), the mail server 212 notifies the domain name "tmB.NET" of the mail server 212 to the mail server 211, by the SMTP command EHLO. In response to this, the mail server 211 notifies the domain name "tmA.NET" of the mail server 211 to the mail server 212 by the SMTP response (the number 250) in the process (19).

Subsequently, in the process (20), the mail server 212 notifies the fact that the transmitter of the electronic mail (electronic mail of the delivery confirmation by the DSN) is "YOU@tmB.NET" to the mail server 211 by the SMTP command. In the process (22), the mail server 212 notifies the fact that the destination of the electronic mail is "ME@tmA.NET" to the mail server 211 by the SMTP command. Moreover, when reception is carried out normally, the mail server 211 returns "OK" to these SMTP commands by the SMTP response (the number 250) in the processes (21) and (23).

After that, in the process (24), the mail server 212 transmits the SMTP command DATA, and in the process (25), "end with <CRLF>.<CRLF>" as the terminator is returned by the SMTP response (the number 354) from the mail server 211. In the process (26), the mail server 212 then transmits the electronic mail data of the delivery confirmation of the DSN. Finally in the process (27), the mail server 212 transmits <CRLF>.<CRLF>which is to be the terminator. When the mail server 211 carries out the reception normally, the mail server 211 returns "OK" by the SMTP response (the number 250) in the process (28), and the forwarding of the electronic mail of the delivery confirmation of the DSN is completed.

Finally, the mail server 212 sends the SMTP command QUIT in the process (29) in order to end the session, and the mail server 211 transmits "Service closing transmission channel" of the SMTP response (the number 221) in the process (30), and in the process (31), the communication is ended by disconnecting the TCP connection.

In this manner, when transmitting the electronic mail with the delivery confirmation demand by the DSN, the mail server can receive the electronic mail of the delivery confirmation while the session is continued at this time. Therefore, compared with the case in which the electronic mail of the delivery confirmation is received by a different session as in a conventional manner, it is possible to receive the electronic mail of the delivery confirmation in a remarkably shorter period of time.

Further, in the example described above, the SMTP command TURN is used for the transmission right reversing command, but the transmission right reversing command of the present invention is not limited to this, and any command can be used if it is the command which can exchange the transmitting side and the receiving side. For example, in the case where the machines at both sides are machines which can interpret a nonstandard command, the machine at one side hands the transmission right to the machine at the other side by using this nonstandard command.

Seventh Embodiment

Figure 26:
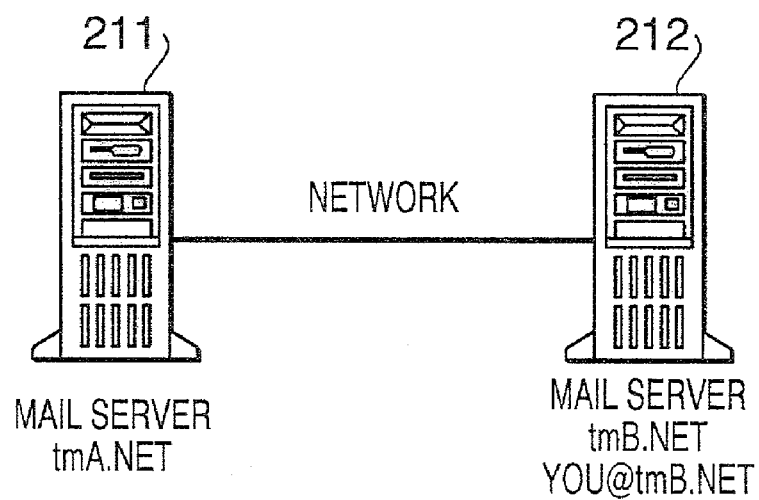
FIG. 26 is a block diagram showing a seventh embodiment of the communication system of the present invention.

FIG. 26 is a block diagram showing a seventh embodiment of the present invention. In FIG. 26, for the same parts with FIG. 24, the same reference numerals are applied to the parts, and the description of these parts will be omitted. In the example of FIG. 26, the mail server 212 is the destination (receiver) of the electronic mail. In this example, the mail server 212 can return the delivery confirmation by the DSN in the same manner as the embodiment described above, and also can return the delivery confirmation concerning the electronic mail with the delivery confirmation demand by the MDN which is addressed to the mail server 212 itself.

Figure 27:
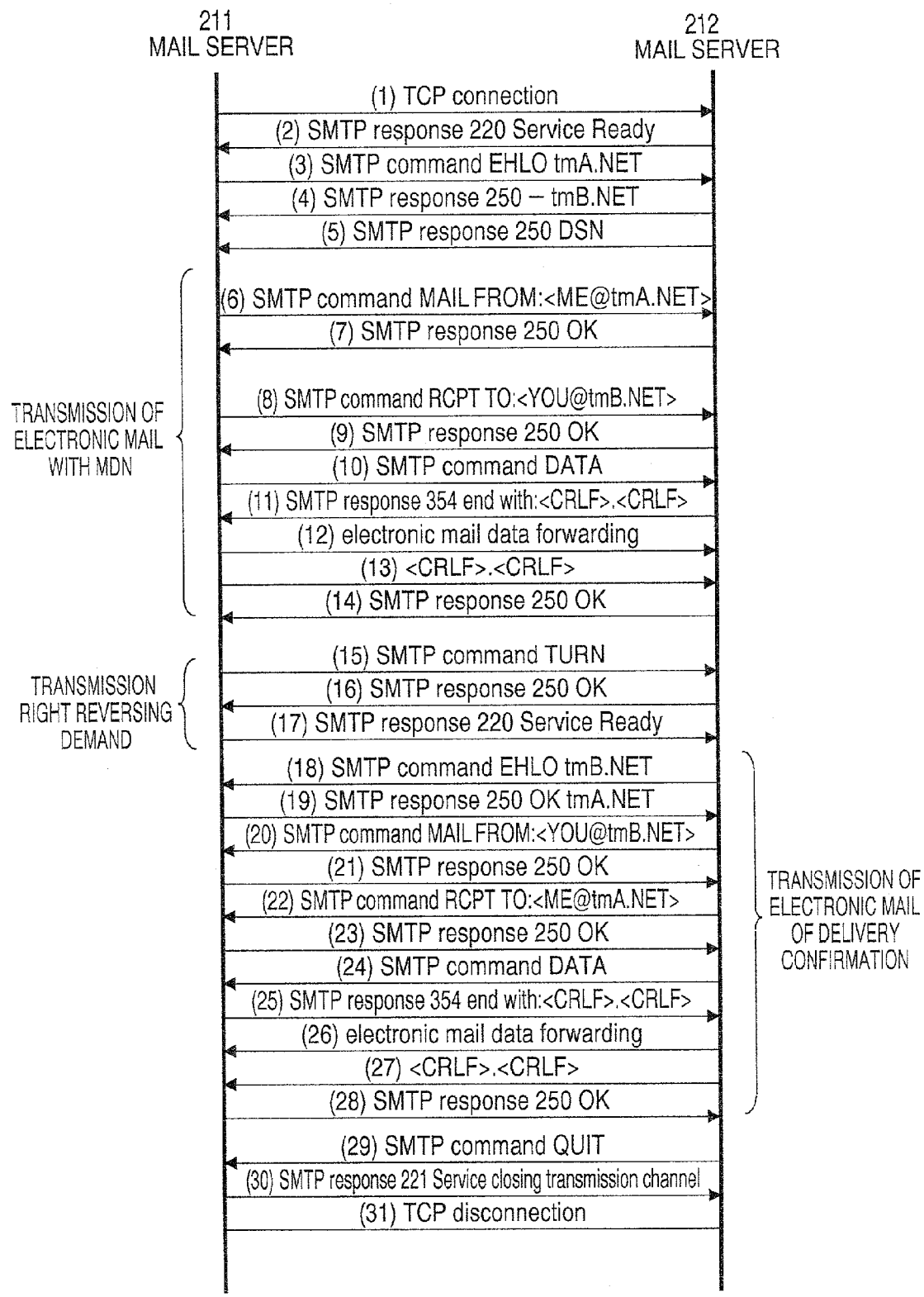
FIG. 27 is a view showing a specific example of the communication procedure according to the seventh embodiment of the communication system of the present invention.

FIG. 27 is an illustration showing an example of the communication procedure according to the seventh embodiment of the present invention. FIG. 28 is an illustration showing a main part of the electronic mail having the delivery confirmation demand by the MDN. In this example, the electronic mail having the MDN demand addressed to the mail server 212 is forwarded from the mail server 211 by the SMTP. Further, in this example, the domain name of the mail server 211 is "tmA.NET", the domain name of the mail server 212 is "tmB.NET", and the electronic mail address of the mail server 212 is "YOU@tmB.NET". Moreover, the electronic mail address of the transmitter of the electronic mail is "ME@tmA.NET". The transmitter of the electronic mail does not have to be the mail server 211, and may be another client.

The communication procedure shown in FIG. 27 is almost the same as the procedure shown in FIG. 25, and differs in that the information for the DSN is not transmitted in the processes (6) and (8) shown in FIG. 25. In the case of the MDN, as shown in FIG. 28, the delivery confirmation demand is written within the electronic mail. FIG. 28 shows an example of a header section of the electronic mail, and it is indicated that the electronic mail of the delivery confirmation should be returned to "ME@tmA.NET" which is written after "Disposition-Notification-To:" in the sixth line (the line shown by the arrow).

The mail server 212 learns that the electronic mail is addressed to the mail server 212 itself at the time the destination is notified in the process (8) in FIG. 27. After that, when receiving the forwarding of the data of the electronic mail in the process (12), the mail server 212 analyzes the contents of that data and recognizes that the delivery confirmation by the MDN is to be returned to the electronic mail address "ME@tmA.NET".

As described in FIG. 25, when the forwarding procedure of the electronic mail until the process (14) is ended, the mail server 211, in one example, transmits the SMTP command TURN as the transmission right reversing command in the process (15). Of course, the transmission right reversing command is not limited to the TURN command in this case, and another command which has the similar function may also be used.

In the process (16), the mail server 212 returns "OK" by the SMTP response (the number 250) in response to the TURN command from the mail server 211. Subsequently, after the mail server 212 receives "Service Ready" by the SMTP response (the number 220) from the mail server 211 in the process (17), the mail server 212 sends back the electronic mail of the delivery confirmation by the MDN to the electronic mail address "ME@tmA.NET" by the processes (18) to (28).

Finally, the mail server 212 sends the SMTP command QUIT in the process (29) in order to terminate the session, the mail server 211 sends the "Service closing transmission channel" of the SMTP response (the number 221) in the process (30), and the communication is terminated by disconnecting the TCP connection in the process (31).

As in the manner stated above, when the electronic mail having the delivery confirmation demand by the MDN is forwarded, the electronic mail of the delivery confirmation can be received while the session at this time is maintained. Accordingly, compared with the case where the electronic mail of the delivery confirmation is received in a different session as in a conventional manner, the electronic mail of the delivery confirmation can be received within a remarkably shorter period of time.

Furthermore, in the embodiment described above, the communication between the mail servers by the SMTP is carried out as a premise. However, even in the case of another protocol, so long as such a protocol can reverse the transmission side and reception side by transmitting the transmission right reversing command, the present invention can be realized in the same manner by using such a protocol.

Figure 29:
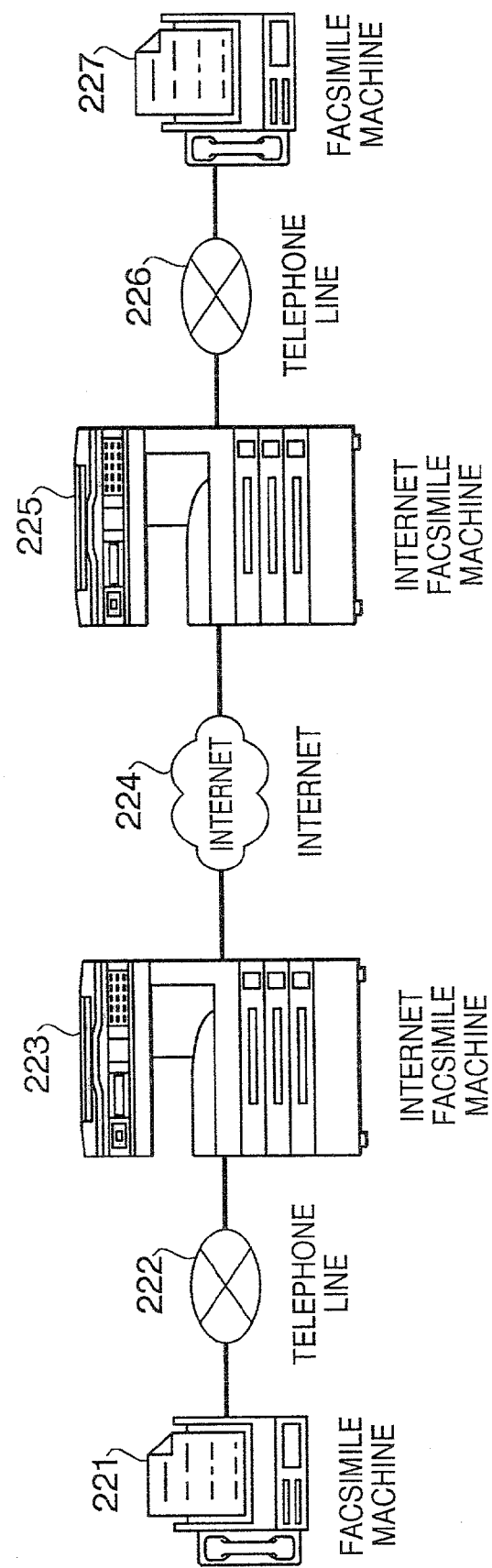
FIG. 29 is a block diagram showing the application of the communication system according to the seventh embodiment of the present invention.

FIG. 29 is a block diagram showing an applied example of a communication system according to an embodiment of the present invention. In FIG. 29, reference numerals 221 and 227 designate facsimile machines, 222 and 226 telephone lines, 223 and 225 Internet facsimile machines, and 224 the Internet. Both of the Internet facsimile machines 223 and 225 are the server type network apparatus connected to the Internet 224, and have the function similar to the mail server 211 and the mail server 212 of the embodiment of the communication system described above.

For example, when the facsimile machine 221 transmits the image to the facsimile machine 227, the line is connected to the Internet facsimile machine 223 via the telephone line 222. Subsequently, the facsimile machine 221 carries out notification of a domain or an electronic mail address of the Internet facsimile machine 225 as well as a telephone number of the facsimile machine 227, and transmits the transmission image data.

The Internet facsimile machine 223 forwards, to the Internet facsimile machine 225 via the Internet 224, the electronic mail of the image received from the facsimile machine 221, along with the received telephone number of the facsimile machine 227. Furthermore, the electronic mail address at this time can be of various forms, such as the electronic mail address of the Internet facsimile machine 225, or the electronic mail address including the domain name of the Internet facsimile machine 225 and the telephone number of the facsimile machine 227. In either case, the address of the electronic mail is designated so that the Internet facsimile machine 225 can receive the electronic mail.

In addition, at this time, the information for demanding the delivery confirmation can be attached to the electronic mail to be forwarded to the Internet facsimile machine 225. The delivery confirmation demand in this case may be the DSN or the MDN. In this case, since the Internet facsimile machine 225 is the destination (receiver) of the electronic mail, even in the case of the MDN, the electronic mail of the delivery confirmation is to be returned from the Internet facsimile machine 225. The attachment of the delivery confirmation demand can be carried out, for example, by following the demand from the facsimile machine 221, or automatically by the Internet facsimile machine 223.

As in the manner stated in each embodiment, the Internet facsimile machine 223 forwards the electronic mail and then transmits the transmission right reversing command. The Internet facsimile machine 225 which received the transmission right reversing command transmits the electronic mail of the delivery confirmation to the Internet facsimile machine 223 by the DSN or the MDN.

Further, it is possible to judge whether or not the Internet facsimile machine 225 is the destination which will return the electronic mail of the delivery confirmation when the transmission right reversing command is transmitted. For example, this judgment can be made by, at the facsimile machine 221, setting this judgment as one setting item of various ones which are set at the time of the transmission, and informing the Internet facsimile machine 223 of it at the time of the transmission. At the facsimile machine 221, by registering various setting items including such a setting item in the one-touch key or the speed dial key in advance, it is possible to easily make the indication. Furthermore, by registering, in the Internet facsimile machine 223, a list of the destinations which will return the electronic mail of the delivery confirmation when the transmission right reversing command is transmitted, it is possible to transmit the transmission right reversing command to the destination in the case where this destination is the registered destination which will return the electronic mail of the delivery confirmation. In addition, it is possible to know such ability of the destination in a different manner.

The Internet facsimile machine 223 which received the electronic mail of the delivery confirmation can transmit the facsimile image including the contents of the delivery confirmation to the facsimile machine 221 by making it remain in the log, following the demand, or as a service. As in the manner stated above, when the Internet facsimile machine 223 transmits the image, the Internet facsimile machine 223 can obtain he delivery confirmation from the Internet facsimile machine 225 immediately, and it is possible to reduce a required period of time from the time the image is transmitted to the time the delivery confirmation is received.

The Internet facsimile machine 225 which received the electronic mail including the image addressed to the facsimile machine 227 obtains the telephone number of the facsimile machine 227 from the contents of the electronic mail, and carries out the facsimile transmission of the image to the facsimile machine 227 via the telephone line 226. As in the manner stated above, the image transmitted from the facsimile machine 221 reaches the facsimile machine 227 via the Internet 224. In the telephone line, the communication fee varies in accordance with the distance, but in the Internet, the communication fee is independent of the distance. Therefore, in the case of the long distance image transmission, there are cases in which the image can be transmitted via the Internet at a lower cost.

In the example shown in FIG. 29, the communication is carried out through the telephone line, between the Internet facsimile machines 223, 225 and the communication terminal devices such as the facsimile machines. However, the present invention is not limited to this example, and for example, the facsimile communication can be carried out from or to the terminal device which is connected to the Internet facsimile machine via the LAN or the like. In addition to that, the facsimile transmission from the Internet facsimile machine, or the facsimile receiving by the Internet facsimile machine can be carried out.

What is claimed is:

1. An Internet facsimile communication method comprising:
    forming image data of an original per page to be transmitted;
    attaching each of the formed image data to one electronic mail respectively; and
    transmitting each electronic mail,
    wherein a plurality of the electronic mails to which each of the image data formed per page of the original has been attached respectively, are transmitted to a mail server at a destination within a same electronic mail forwarding protocol session.

2. The Internet facsimile communication method according to claim 1, wherein the mail server at the destination is not a relay mail server, but an Internet facsimile machine having a mail server function.

3. An Internet facsimile communication method comprising:
    judging whether or not a destination of image data is a destination to which electronic mail can be transmitted without passing through a relay mail server, and whether or not the destination of the image data is an Internet facsimile machine having a mail server function;
    forming image data of an original per page to be transmitted, and transmitting each of the image data formed per page as an attached file of one electronic mail respectively, if the destination of the image data is the destination to which electronic mail can be transmitted without passing through the relay mail server, and the destination of the image data is the Internet facsimile machine having the mail server function;
    forming all pages of the original as one image file, and transmitting the image file as an attached file of one electronic mail, if the destination of the image data is not the destination to which electronic mail can be transmitted without passing through the relay mail server, or if the destination of the image data is not the Internet facsimile machine having the mail server function.

4. An Internet facsimile machine comprising means for receiving electronic mail; and means for, if receiving a plurality of electronic mails within one electronic mail forwarding protocol session, carrying out output processing of each of the electronic mails each time the each of the electronic mails is received.

5. An Internet facsimile machine comprising means for receiving electronic mail; and means for, if receiving a plurality of electronic mails within one electronic mail forwarding protocol session, sending back electronic mail showing a reception processing result of each of the electronic mails each time the each of the electronic mails is received.

6. An Internet facsimile machine comprising means for receiving electronic mail; and means for, if receiving a plurality of electronic mails within one electronic mail forwarding protocol session, sending back electronic mail showing a reception processing result of all of the electronic mails by one transmission after receiving all of the electronic mails.

7. An Internet facsimile machine comprising: means for forming image data of an original, per page, to be transmitted; and means for transmitting each image data formed per page as an attached file of one electronic mail respectively to a mail server at a destination within a same electronic mail forwarding protocol session.

8. The Internet facsimile machine according to claim 7, wherein the mail server at the destination is not a relay mail server, but an Internet facsimile machine having a mail server function.

9. An Internet facsimile machine comprising:
    means for judging whether or not a destination of image data is a destination to which electronic mail can be transmitted without passing through a relay mail server, and whether or not the destination of the image data is an Internet facsimile machine having a mail server function;
    means for forming image data of an original per page to be transmitted, and transmitting each of the image data formed per page as an attached file of one electronic mail respectively, if the destination of the image data is the destination to which electronic mail can be transmitted without passing through the relay mail server, and the destination of the image data is the Internet facsimile machine having the mail server function; and
    means for forming all pages of the original as one image file, and transmitting the image file as an attached file of one electronic mail respectively, if the destination of the image data is not the destination to which electronic mail can be transmitted without passing through the relay mail server, or if the destination of the image data is not the Internet facsimile machine having the mail server function.

10. An Internet facsimile communication method comprising the steps of:
    judging whether or not an Internet facsimile machine at a transmitting side is connected directly to an Internet facsimile machine at a receiving side without passing through other mail server(s);
    designating proceeding to a special communication mode to the Internet facsimile machine at the receiving side if it is judged that the Internet facsimile machine at the transmitting side is connected directly to the Internet facsimile machine at the receiving side without passing through the other mail sever(s);
    receiving, by electronic mail, ability information of the Internet facsimile machine at the receiving side which has received designation of the proceeding to the special communication mode;
    forming image data based on the received ability information;
    transmitting the formed image data by electronic mail to the Internet facsimile machine at the receiving side,
    wherein the transmitting and the receiving of the electronic mails are carried out reciprocally between the Internet facsimile machines at the transmitting side and at the receiving side within a same electronic mail forwarding protocol session.

11. The Internet facsimile communication method according to claim 10, wherein in the step of forming the image data, a format concerning one of or both of resolution of the image data and a paper size is determined based on the ability information.

12. The Internet facsimile communication method according to claim 10, wherein, the judgment in the step of judging is made based on whether or not a domain name of a mail address of the destination corresponds to a domain name of a mail server of the destination, and the domain name of the mail server is obtained by asking a DNS server.

13. The Internet facsimile communication method according to claim 10, wherein the judgment in the step of judging is made based on a response command from the Internet facsimile machine at the receiving side which is a response to an electronic mail forwarding protocol command which has been transmitted from the Internet facsimile machine at the transmitting side and designates a receiver of electronic mail.

14. An Internet facsimile machine at a transmitting side comprising:
   means for judging whether or not connection is made directly with an Internet facsimile machine at a receiving side without passing through other mail server(s);
   means for designating proceeding to a special communication mode to the Internet facsimile machine at the receiving side, and transferring a transmission right of electronic mail to the Internet facsimile machine at the receiving side, if it is judged that the connection is made directly with the Internet facsimile machine at the receiving side without passing through the other mail server(s);
   means for transmitting, to the Internet facsimile machine at the receiving side, image data formed based on ability information of the Internet facsimile machine at the receiving side when the Internet facsimile machine at the transmitting side is notified of the ability information of the Internet facsimile machine at the receiving side which has received notification of the proceeding to the special communication mode, and the Internet facsimile machine at the transmitting side receives the transmission right.

15. The Internet facsimile machine according to claim 14, wherein a format concerning one of or both of resolution of the image data and a paper size is determined based on the ability information when the image data is formed.

16. An Internet facsimile machine at a receiving side comprising:
   means for notifying ability information of the Internet facsimile machine at the receiving side to an Internet facsimile machine at a transmitting side, and transferring a transmission right of electronic mail to the Internet facsimile machine at the transmitting side, when from the Internet facsimile machine at the transmitting side connected to the receiving side, proceeding to a special communication mode is designated to the Internet facsimile machine at the receiving side, and the Internet facsimile machine at the receiving side receives the transmission right of electronic mail; and
   means for receiving image data transmitted, by electronic mail, from the Internet facsimile machine at the transmitting side which has received the ability information.

17. The Internet facsimile machine according to claim 16, wherein the ability information is used for determining a format concerning one of or both of resolution of the image data and a paper size.

18. An electronic mail communication system comprising:
   a machine at a transmitting side for carrying out forwarding of electronic mail with a machine at a receiving side, and transmitting a transmission right reversing command after transmitting electronic mail having a delivery confirmation demand to the machine at the receiving side; and
   the machine at the receiving side for transmitting delivery confirmation concerning the received electronic mail when the machine at the receiving side receives the transmission right reversing command after receiving the electronic mail having the delivery confirmation demand.

19. An electronic mail communication machine for forwarding electronic mail to a machine at a receiving side, wherein in a case where it is certain that when the electronic mail communication machine transmits electronic mail having a delivery confirmation demand, the machine at the receiving side sends back delivery confirmation, the electronic mail communication machine transmits a transmission right reversing command after the electronic mail communication machine transmits the electronic mail having the delivery confirmation command so that the electronic mail communication machine can receive the delivery confirmation from the machine at the receiving side.

20. An electronic mail communication machine for receiving electronic mail transmitted from a machine at a transmitting side, wherein in a case where the electronic mail communication machine receives a transmission right reversing right from the machine at the transmitting side after receiving electronic mail having a delivery confirmation demand, the electronic mail communication machine transmits delivery confirmation concerning the received electronic mail.

* * * * *